(12) United States Patent
Payne

(10) Patent No.: US 12,179,580 B2
(45) Date of Patent: Dec. 31, 2024

(54) TRACK ASSEMBLY WITH ELECTRIC MOTOR

(71) Applicant: CNH Industrial America LLC, New Holland, PA (US)

(72) Inventor: Daniel Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 36 days.

(21) Appl. No.: 18/322,972

(22) Filed: May 24, 2023

(65) Prior Publication Data

US 2023/0294513 A1    Sep. 21, 2023

Related U.S. Application Data

(62) Division of application No. 17/124,222, filed on Dec. 16, 2020, now Pat. No. 11,707,980.

(51) Int. Cl.
| | |
|---|---|
| *B60K 17/04* | (2006.01) |
| *B60K 1/00* | (2006.01) |
| *B60K 7/00* | (2006.01) |
| *B60K 17/02* | (2006.01) |
| *B60K 17/12* | (2006.01) |

(52) U.S. Cl.
CPC .............. *B60K 17/046* (2013.01); *B60K 1/00* (2013.01); *B60K 7/0007* (2013.01); *B60K 17/02* (2013.01); *B60K 17/12* (2013.01); *B60K 2001/006* (2013.01); *B60K 2007/0092* (2013.01)

(58) Field of Classification Search
CPC ...... B60K 17/046; B60K 17/02; B60K 17/12; B60K 1/00; B60K 7/0007; B60K 2001/006; B60K 2007/0092
See application file for complete search history.

(56) References Cited

U.S. PATENT DOCUMENTS

| | | | |
|---|---|---|---|
| 5,248,008 A | 9/1993 | Clar | |
| 6,655,482 B2 * | 12/2003 | Simmons | B62D 55/125 180/9.1 |
| 8,240,783 B2 * | 8/2012 | Johnson | B62D 55/30 305/141 |
| 9,505,454 B1 * | 11/2016 | Kautsch | B62D 55/112 |
| 9,656,703 B2 | 5/2017 | Zuchoski et al. | |
| 10,207,754 B2 | 2/2019 | Lewis et al. | |
| 10,889,341 B2 * | 1/2021 | Warr | B62D 55/08 |
| 11,046,377 B2 | 6/2021 | Boily et al. | |
| 11,148,745 B1 | 10/2021 | Parker | |
| 11,173,971 B2 * | 11/2021 | Kautsch | B62D 21/14 |
| 2004/0119336 A1 * | 6/2004 | Lussier | B62D 55/305 305/145 |
| 2004/0216932 A1 * | 11/2004 | Giovanetti | B62D 55/065 180/9.1 |
| 2007/0080236 A1 | 4/2007 | Betz et al. | |

(Continued)

*Primary Examiner* — Erez Gurari
(74) *Attorney, Agent, or Firm* — Rickard K. DeMille; Rebecca L. Henkel; Peter K. Zacharias

(57) ABSTRACT

A track assembly includes a frame configured to be coupled to a chassis of a vehicle, a first wheel and a second wheel each pivotally coupled to the frame, a track engaging the first wheel and the second wheel, and a motor coupled to the track and the frame. The track extends along a track path that surrounds the first wheel and the second wheel. The motor is configured to drive the first wheel such that the track moves along the track path. The motor and the first wheel are aligned.

20 Claims, 18 Drawing Sheets

(56) References Cited

U.S. PATENT DOCUMENTS

| | | | |
|---|---|---|---|
| 2008/0179115 A1* | 7/2008 | Ohm | B62D 55/075 901/1 |
| 2008/0196946 A1* | 8/2008 | Filippov | B62D 37/00 180/9.1 |
| 2010/0252338 A1 | 10/2010 | Xie | |
| 2011/0315459 A1 | 12/2011 | Zuchoski et al. | |
| 2012/0205171 A1* | 8/2012 | Takishita | B60K 25/02 180/68.1 |
| 2016/0083028 A1* | 3/2016 | Hellholm | B62D 55/14 180/9.42 |
| 2017/0036714 A1* | 2/2017 | Lunkenbein | B62D 55/14 |
| 2017/0113742 A1 | 4/2017 | Tratta et al. | |
| 2018/0112530 A1 | 4/2018 | Fliearman et al. | |
| 2018/0118014 A1* | 5/2018 | Wantschik | B60K 1/00 |
| 2019/0023072 A1 | 1/2019 | Lubben et al. | |
| 2020/0094894 A1* | 3/2020 | Kreis | B60K 6/20 |
| 2020/0114749 A1* | 4/2020 | Kreis | B60K 6/52 |
| 2020/0189672 A1* | 6/2020 | Gnedov | B62D 55/14 |
| 2020/0223480 A1* | 7/2020 | Pepin | B62D 7/18 |
| 2021/0147012 A1 | 5/2021 | Hellholm et al. | |
| 2021/0179071 A1* | 6/2021 | Kuras | B60W 10/08 |
| 2021/0179170 A1 | 6/2021 | Cowper et al. | |
| 2021/0229760 A1* | 7/2021 | Koizumi | B62D 55/30 |
| 2021/0253185 A1* | 8/2021 | Sauvageau | B62D 55/116 |
| 2021/0341914 A1 | 11/2021 | Flemming et al. | |
| 2021/0388825 A1 | 12/2021 | Watt et al. | |
| 2021/0403106 A1 | 12/2021 | Sterling | |
| 2022/0185092 A1* | 6/2022 | Payne | B60K 6/40 |
| 2022/0224207 A1 | 7/2022 | Bruneau et al. | |
| 2022/0314782 A1 | 10/2022 | Shinozaki et al. | |
| 2023/0112003 A1* | 4/2023 | Krog | B60L 1/003 172/1 |
| 2023/0140923 A1* | 5/2023 | Medeiros | B60K 17/165 475/231 |
| 2024/0166277 A1* | 5/2024 | Thoren et al. | B62D 55/10 |
| 2024/0166279 A1* | 5/2024 | Thoren et al. | B62D 55/125 |

* cited by examiner

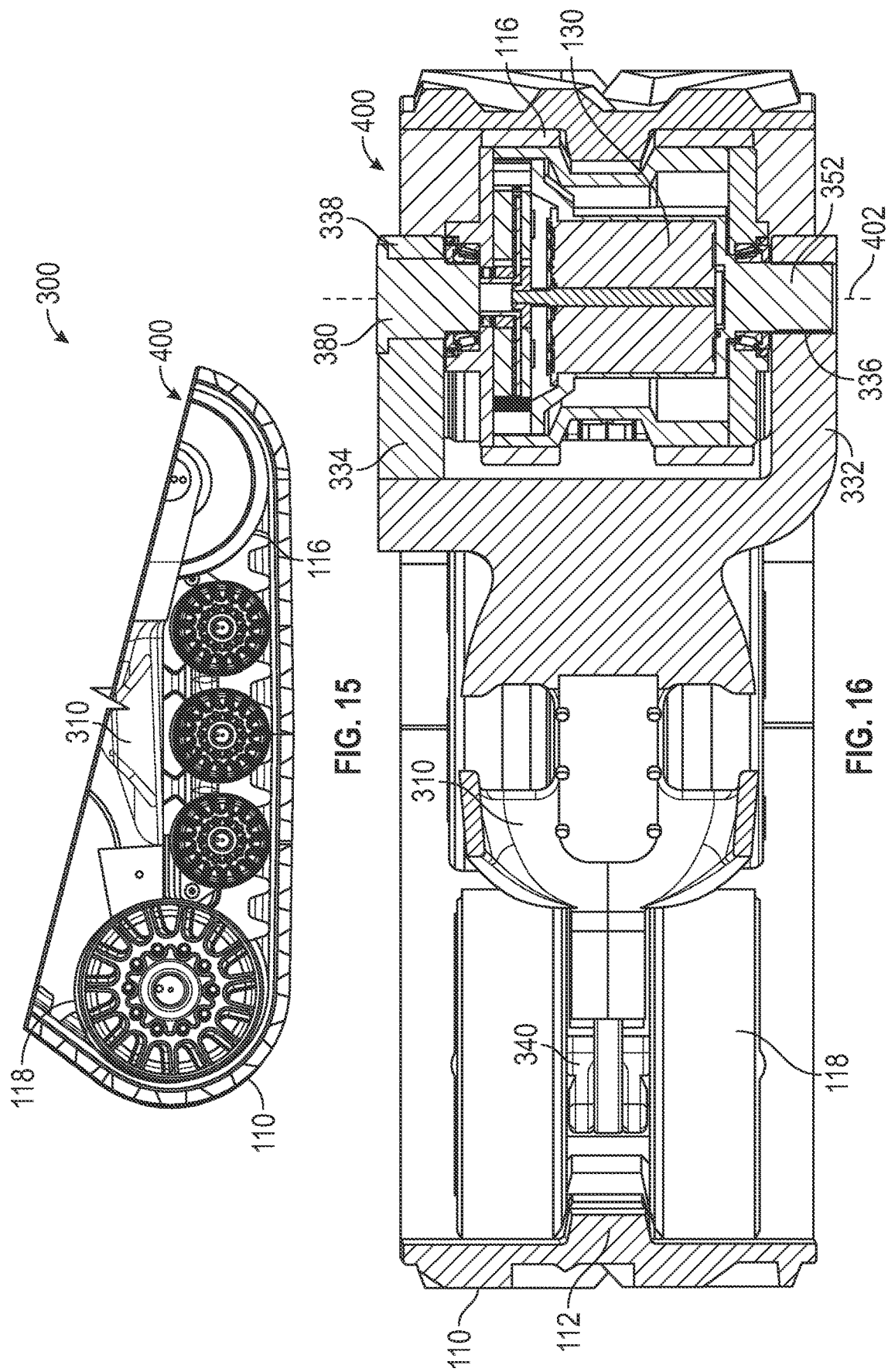

TRACK ASSEMBLY WITH ELECTRIC MOTOR

CROSS-REFERENCE TO RELATED APPLICATIONS

This application is a divisional of U.S. patent application Ser. No. 17/124,222, filed on Dec. 16, 2020, the entire disclosure of which is incorporated herein by reference in its entirety.

BACKGROUND

Certain vehicles (e.g., agricultural and construction machinery) utilize track assemblies to support and propel themselves. The track assemblies each have a large area that contacts the ground, which reduces the ground pressure exerted by the vehicle. This reduced ground pressure can be advantageous when traveling across soft soils. Track assemblies include a track that is supported by a series of wheels. During operation, an engine of the vehicle drives the track to move along a track path surrounding these wheels, causing the track to move along the ground and propel the vehicle.

SUMMARY

One embodiment relates to a track assembly. The track assembly includes a frame configured to be coupled to a chassis of a vehicle, a first wheel and a second wheel each pivotally coupled to the frame, a track engaging the first wheel and the second wheel, and a motor coupled to the track and the frame. The track extends along a track path that surrounds the first wheel and the second wheel. The motor is configured to drive the first wheel such that the track moves along the track path. The motor and the first wheel are aligned.

Another embodiment relates to a track assembly. The track assembly includes a frame configured to be coupled to a chassis of a vehicle, a drive wheel engaging a track, a motor including a motor shaft and a motor body, the motor shaft being positioned to drive the drive wheel to propel the track, a first pin coupling the motor body to the frame, and a second pin pivotally coupling the drive wheel to the frame. The first pin, the second pin, the motor shaft, and the drive wheel are aligned Still another embodiment relates to a vehicle. The vehicle includes a chassis, a track frame coupled to the chassis, a drive wheel engaging a track, a motor including a motor shaft and a motor body, the motor shaft being positioned to drive the drive wheel to propel the track, a pin coupling the motor to the track frame, and a clutch selectively coupling the motor shaft to the drive wheel. The clutch is positioned between the motor body and the pin, and wherein the pin and the motor shaft are aligned.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 15 is a side view of the track assembly of FIG. 10 including a drive module, according to an exemplary embodiment.

FIGS. 16 and 17 are perspective section views of the track assembly of FIG. 15.

DETAILED DESCRIPTION

Figure 1:
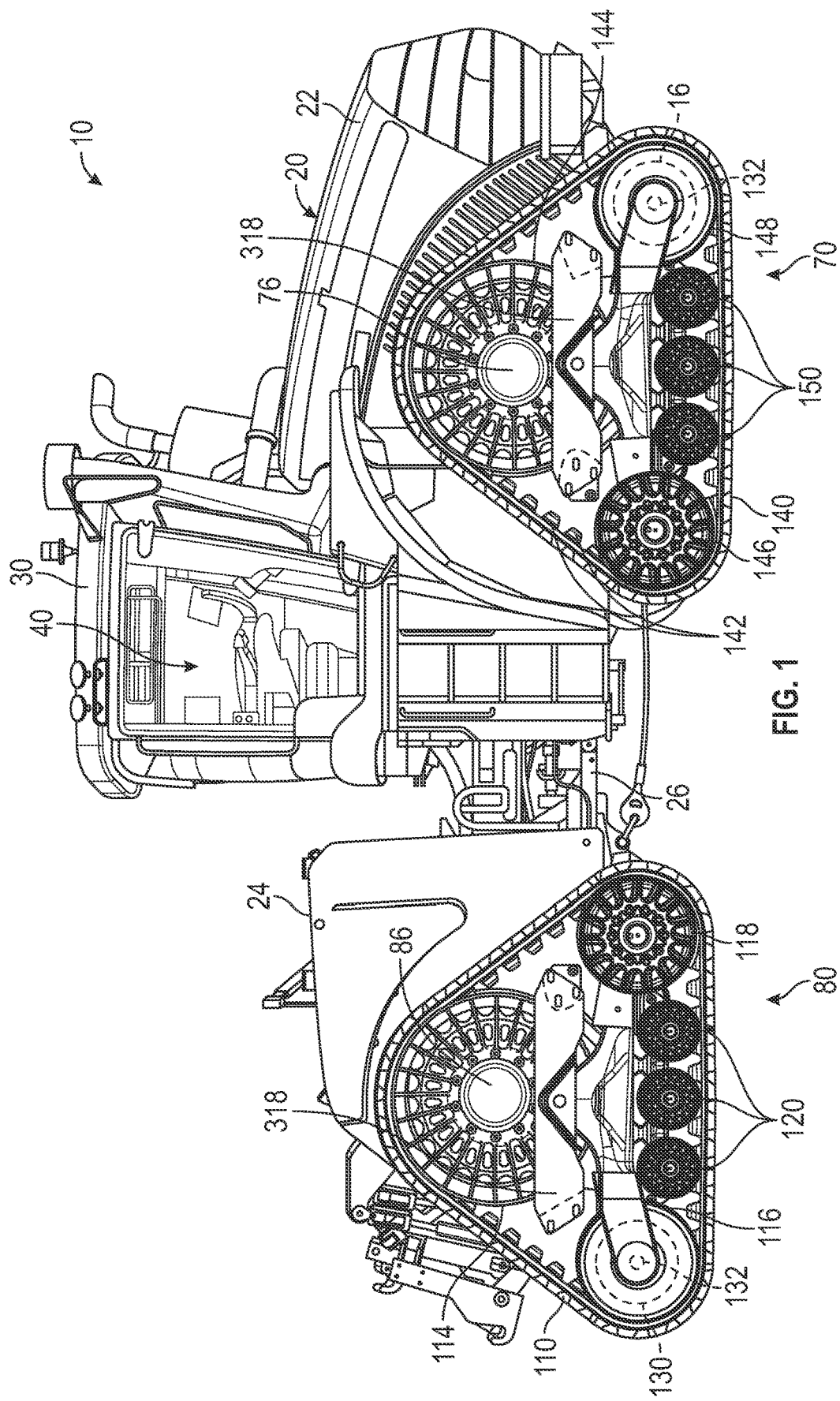
FIG. 1 is a right view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes track assemblies that support and propel the vehicle. A first track assembly includes a first main drive wheel and a first auxiliary drive wheel, each engaged with a first track. A second track assembly includes a second main drive wheel and a second auxiliary drive wheel, each engaged with a second track. The first main drive wheel and the second main drive wheel are both at least selectively coupled (e.g., in constant rotational engagement, in selective rotational engagement as controlled by a clutch, etc.) to a prime mover (e.g., an engine) of the vehicle. The prime mover may drive the first track and/or the second track through the first main drive wheel and the second main drive wheel, respectively. The first auxiliary drive wheel is at least selectively coupled to a first electric motor. The first electric motor may drive the first track through the first auxiliary drive wheel. The second auxiliary drive wheel is at least selectively coupled to a second electric motor. The second electric motor may drive the second track through the second auxiliary drive wheel.

The vehicle includes a controller that controls the operation of the prime mover, the first electric motor, and the second electric motor to propel the vehicle, according to various operational modes. In an engine only mode, the prime mover drives the first track and/or the second track without utilizing the electric motors. In an electric only mode, the first electric motor drives the first track, and/or the second electric motor drives the second track, without utilizing the prime mover. In a hybrid mode, the prime mover drives the first track and/or the second track, and at least one of (a) the first electric motor drives the first track or (b) the second electric motor drives the second track. In a turning mode, the first electric motor and/or the second electric motor are used to drive the first track and the second track at different speeds and/or in different directions to facilitate turning the vehicle.

The vehicle may be operated in various speed ranges, depending upon the task that is being performed by the operator of the vehicle. According to one embodiment, the vehicle is operated in a working speed range while working (e.g., while utilizing an implement at a job site) and in a travel speed range while traveling (e.g., when moving between different job sites), the travel speed range being faster than the working speed range. In a first, clutchless configuration, the first electric motor is coupled to the first auxiliary wheel (and thus to the first track) during all modes of operation of the vehicle. In such a configuration, the first electric motor may be geared to operate in the travel speed range (e.g., to reach peak efficiency and output power in the travel speed range), thereby avoiding overspeeding the motor when vehicle operates at high speeds. In a second, clutched configuration, the first electric motor is selectively coupled to the first auxiliary wheel (and thus to the first track) by a clutch. In such a configuration, the first electric motor may be geared to operate with the clutch engaged in the working speed range (e.g., to reach peak efficiency and output power in the working speed range). To avoid overspeeding the motor, the clutch may be disengaged when operating at speeds above the working range.

According to an exemplary embodiment, the first electric motor and the auxiliary drive wheel are provided as part of a self-contained drive module. The drive module includes a motor support that is coupled to a motor body of the first electric motor. The motor support includes a post having a splined outer surface that engages a track frame of the track assembly, fixing the motor body to the track frame. The first electric motor is coupled to the first auxiliary drive wheel through a pair of planetary gear sets. Specifically, a motor shaft of the first electric motor is coupled to a sun gear of the first planetary gear set. Ring gears of both planetary gear sets are fixed to the motor support. A carrier of the first gear set is coupled to a sun gear of the second gear set. A carrier of the second gear set is coupled to the first auxiliary drive wheel. The first auxiliary drive wheel surrounds and contains the motor and the planetary gear sets. The first electric motor, the motor support, the planetary gear sets, and the first auxiliary drive wheel are all aligned along a common central axis. By containing the first electric motor and the planetary gear sets within the first auxiliary drive wheel, the overall volume of the drive module is reduced, and the planetary gear sets and the first electric motor are protected from debris by the first auxiliary drive wheel.

Overall Vehicle

Figure 2:
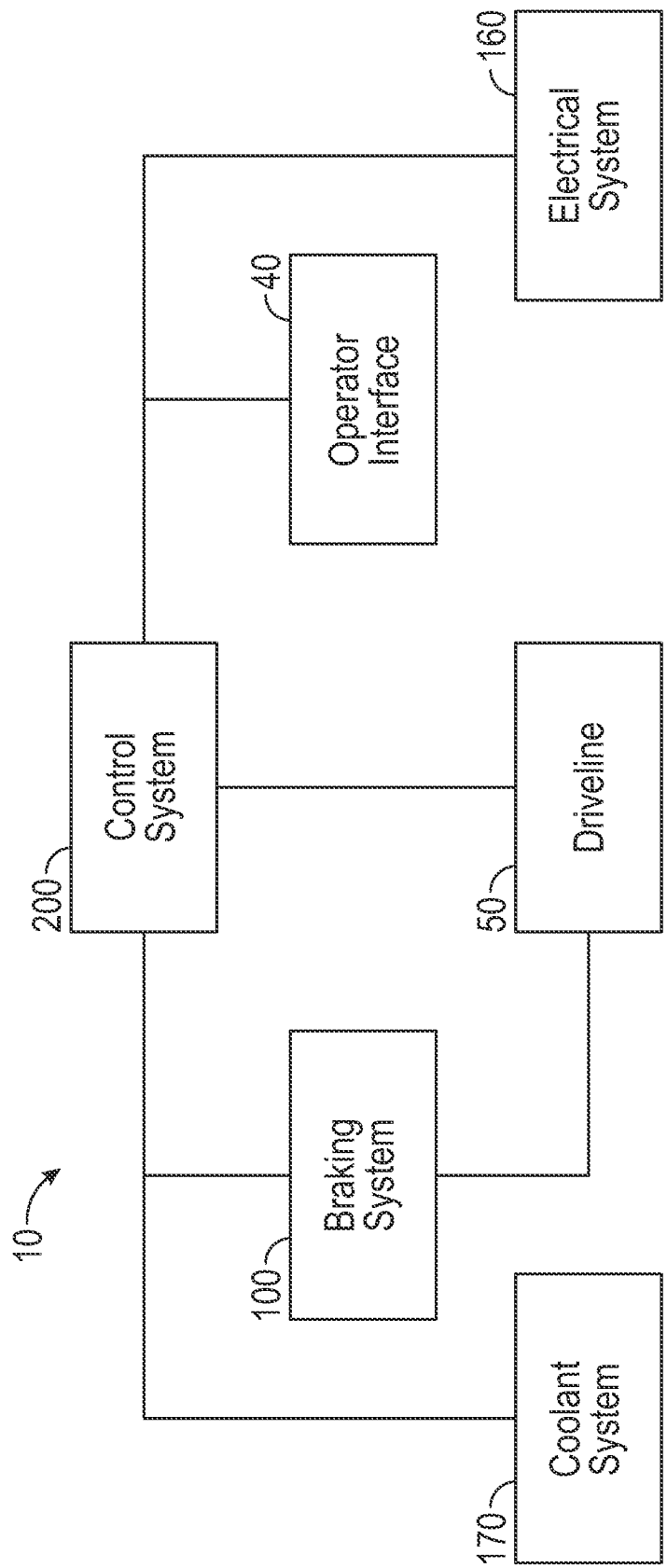
FIG. 2 is a schematic block diagram of the vehicle of FIG. 1, according to an exemplary embodiment.
Figure 3:
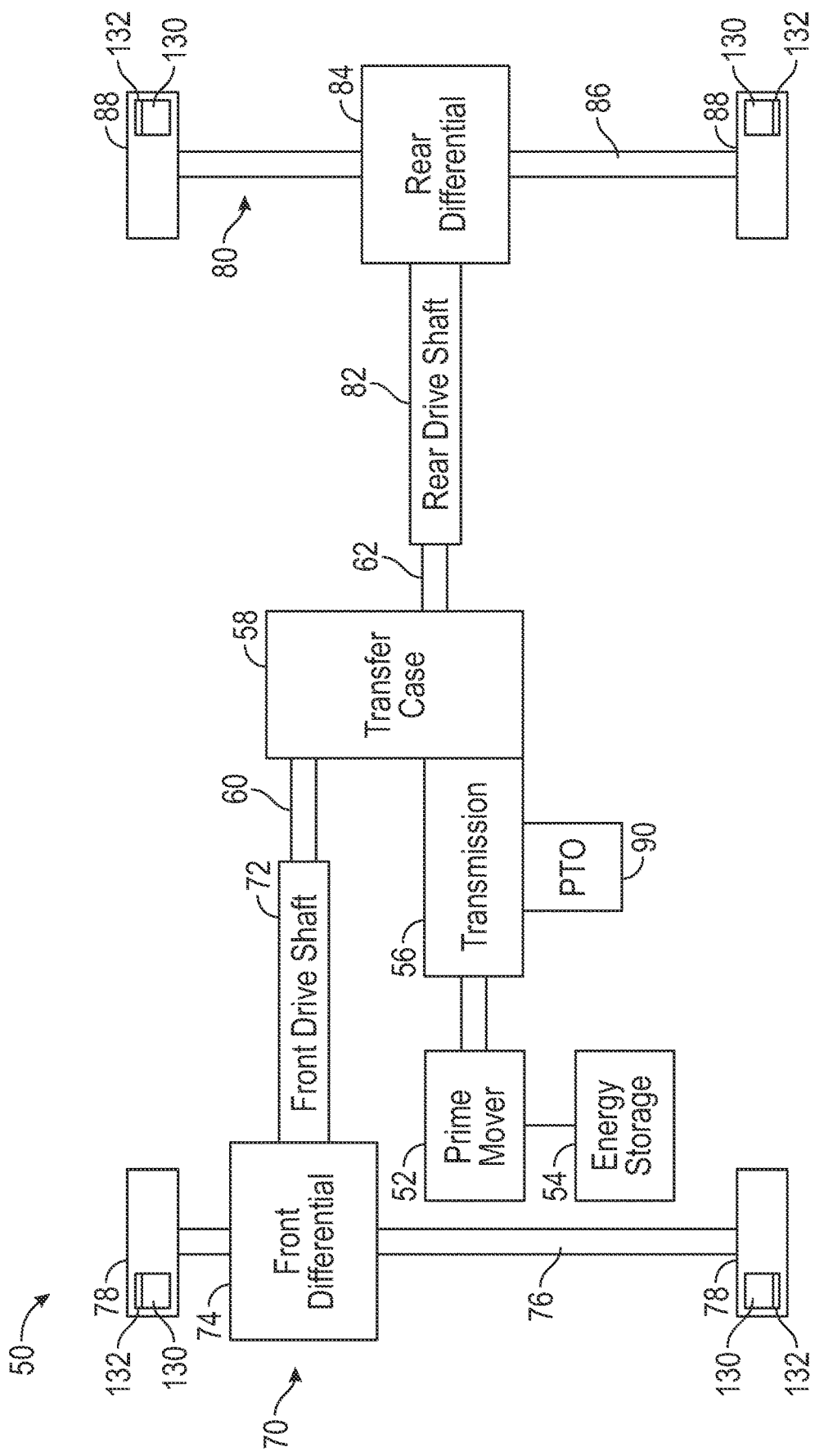
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; an electrical system or power system, shown as electrical system 160, that provides electrical energy to power various functions of the vehicle 10; a cooling system or temperature regulation system, shown as coolant system 170, that regulates the temperature of various components of the vehicle 10; and a control system, shown as control system 200, coupled to the operator interface 40, the driveline 50, the braking system 100, the electrical system 160, and the coolant system 170.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline such that the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline such that the prime mover 52 is an electric motor and the energy storage 54 includes a battery system and/or one or more capacitors. In some embodiments, the driveline 50 is a fuel cell electric driveline such that the prime mover 52 is an electric motor and the energy storage 54 is a fuel cell (e.g., that stores hydrogen, that produces electricity from the hydrogen, etc.). In some embodiments, the driveline 50 is a hybrid driveline such that (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of settings (e.g., gear ratios, etc.) that affect different output speeds thereof based on a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and/or the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to opposing ends of the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.).

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to opposing ends of the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.).

According to the exemplary embodiment shown in FIG. 1, the front tractive elements 78 and the rear tractive elements 88 are structured as track assemblies. In other embodiments, the front tractive elements 78 and the rear tractive elements 88 are otherwise structured (e.g., wheels, etc.). In some embodiments, the front tractive elements 78 and the rear tractive elements 88 are not steerable. In some embodiments, the front tractive elements 78 and the rear tractive elements 88 are steerable. In some embodiments, only one of the front tractive elements 78 or the rear tractive elements 88 is steerable. As shown in FIG. 1, the body 20 is articulated and includes a front portion 22 and a rear portion 24 that pivot relative to one another about a substantially vertical axis. The body 20 includes one or more actuators (e.g., linear actuators, hydraulic cylinders, etc.), shown as turning actuators 26, that rotate the front portion 22 and the rear portion 24 relative to one another about this axis to steer the vehicle 10.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, it should be understood that the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when necessary, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Referring to FIG. 1, the front tractive element 78 and the rear tractive element 88 on the right side of the vehicle 10 are shown according to an exemplary embodiment. In some embodiments, the front tractive element 78 and the rear tractive element 88 on the left side of the vehicle 10 are substantially similar to the front tractive element 78 and the rear tractive element 88 on the right side of the vehicle 10, except the tractive elements on the left side of the vehicle 10 are mirrored relative to the corresponding tractive elements on the right side of the vehicle 10. Accordingly, any description of the front tractive element 78 on the right side of the vehicle 10 may apply to the front tractive element 78 on the left side of the vehicle, unless specified otherwise. Similarly, any description of the rear tractive element 88 on the right side of the vehicle 10 may apply to the rear tractive element 88 on the left side of the vehicle, unless specified otherwise.

Figure 4:
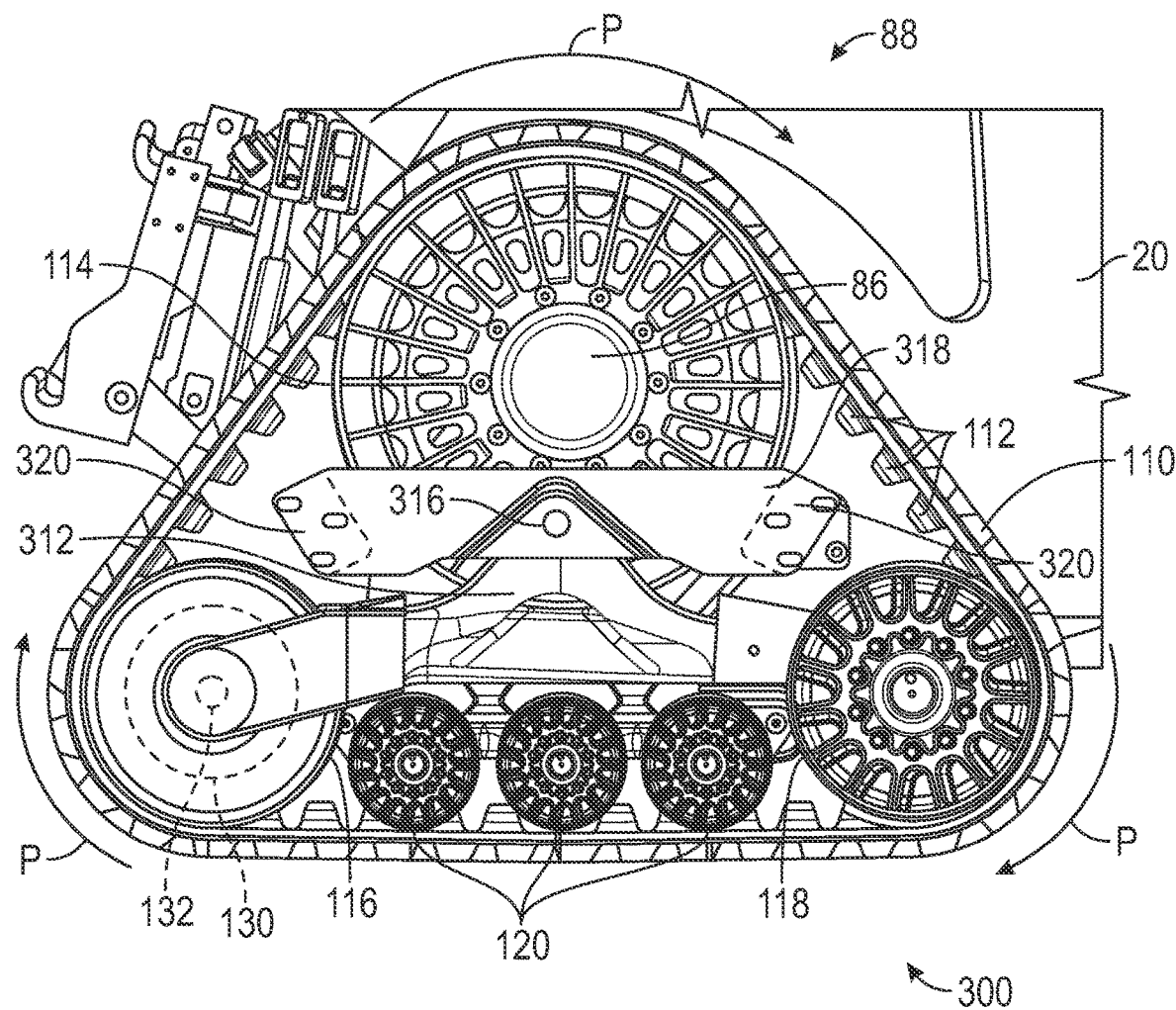
FIG. 4 is a right side view of a rear tractive element of the vehicle of FIG. 1.

Referring to FIGS. 1, 3, and 4, the rear tractive element 88 on the right side of the vehicle 10 includes a continuous, annular drive element or tractive element (e.g., a belt, a track, etc.), shown as track 110, that is positioned to engage the support surface. The track 110 moves along a path or trajectory, shown as track path P. The track path P is defined along a perimeter of the track 110. As shown in FIG. 4, the track path P is a continuous, enclosed shape such that the track 110 moves cyclically along the track path P (e.g., after one revolution of the track 110, a point on the track 110 will return to its starting location relative to the body 20). In some embodiments, the track 110 is flexible to facilitate movement of the track 110 along the track path P. By way of example, the track 110 may include a flexible material, such as rubber or plastic, to facilitate flexibility of the track 110. By way of another example, the track 110 may include multiple segments that are pivotally coupled to one another to facilitate flexibility of the track 110. As shown in FIG. 4, the track 110 includes a series of protrusions or teeth, shown as lugs 112, positioned along an inner surface of the track 110 and extending inward from the inner surface.

Referring still to FIGS. 1 and 4, the rear tractive element 88 includes a series of rollers or wheels including a top wheel or drive wheel, shown as main drive wheel 114; a bottom wheel, drive wheel, or idler wheel, shown as rear wheel 116; a bottom wheel, drive wheel, or idler wheel, shown as front wheel 118; and one or more bottom wheels, drive wheels, idler wheels, or support wheels, shown as center wheels 120. Each of the main drive wheel 114, the rear wheel 116, the front wheel 118, and the center wheels 120 are pivotally coupled to the body 20 and the frame 12. The main drive wheel 114 is positioned above the rear wheel 116 and the front wheel 118. As shown, the rear tractive element 88 includes three of the center wheels 120, each positioned between the rear wheel 116 and the front wheel 118. In other embodiments, the front tractive elements 78 and/or the rear tractive elements 88 include more or fewer center wheels 120. In other embodiments, the main drive wheel 114, the rear wheel 116, the front wheel 118, and/or the center wheels 120 are differently positioned.

As shown in FIGS. 1 and 4, the track 110 surrounds the main drive wheel 114, the rear wheel 116, the front wheel 118, and the center wheels 120. The main drive wheel 114, the rear wheel 116, and the front wheel 118 each engage the inner surface of the track 110, such that the track path P is generally triangular. In some embodiments, the center wheels 120 are in constant engagement with the inner surface of the track 110. In other embodiments, the center wheels 120 selectively engage the inner surface of the track 110 based on the loading of the vehicle 10 and/or the terrain being traversed by the vehicle 10. By way of example, the bottommost points of the center wheels 120 may be raised slightly (e.g., 0.5 inch, 1 inch, etc.) relative to the bottommost points of the rear wheel 116 and the front wheel 118 such that the track 110 does not engage the center wheels 120 when the track 110 is positioned on a flat surface. However, when the track 110 encounters an obstacle (e.g., a mound of soil, a rock, etc.) between the rear wheel 116 and the front wheel 118, the track 110 may deflect upward and engage one or more of the center wheels 120, such that the center wheels 120 support the inner surface of the track 110.

As shown in FIGS. 1 and 4, in the rear tractive elements 88, the main drive wheel 114 is coupled to the rear axle 86. Accordingly, the main drive wheel 114 transfers torque provided by the prime mover 52 through the rear axle 86 to the track 110. The main drive wheel 114 may transfer mechanical energy from the rear axle 86 to the track 110 to drive the track 110 to propel the vehicle 10. Additionally or alternatively, the main drive wheel 114 may transfer mechanical energy from the track 110 to the rear axle 86

(e.g., that is transferred the braking system 100 and/or the prime mover 52) to provide a braking force on the track 110 and slow the vehicle 10. In some embodiments, the main drive wheel 114 is shaped (e.g., with a circumferential tooth pattern) to engage the lugs 112 of the track 110 to transfer forces between the main drive wheel 114 and the track 110 and prevent slip of the track 110 relative to the main drive wheel 114.

Referring to FIGS. 1, 3, and 4, the rear tractive element 88 includes an electromagnetic device or motor/generator, shown as track motor 130, that drives the corresponding track 110. This track motor 130 is coupled to the frame 12 and to the rear wheel 116 of the corresponding rear tractive element 88. The track motor 130 is configured to apply a torque to the corresponding rear wheel 116. In some embodiments, the track motor 130 is operable in a first mode of operation and/or a second mode of operation. In the first mode of operation (e.g., a driving mode, a motoring mode, etc.), the track motor 130 provides rotational mechanical energy to the rear wheel 116 of the rear tractive element 88, causing the rear wheel 116 to rotate relative to the frame 12. Due to the engagement between the rear wheel 116 and the corresponding track 110, the rear wheel 116 transfers the mechanical energy from the track motor 130 to the track 110, causing the track 110 to move along the track path P and propel the vehicle 10. In the second mode of operation (e.g., a braking mode, a generation mode, etc.), the track motor 130 receives rotational mechanical energy from the rear wheel 116, opposing rotation of the rear wheel 116 relative to the frame 12. Due to the engagement between the rear wheel 116 and the corresponding track 110, the rear wheel 116 transfers mechanical energy from the track 110 to the track motor 130, opposing movement of the track 110 and braking the vehicle 10. In the braking mode, the track motor 130 may generate electrical energy (e.g., to charge the energy storage 54, to power one or more systems of the vehicle 10, etc.).

The track motors 130 may rotate in first rotational direction (e.g., a forward direction associated with a forward direction of travel of the vehicle 10), rotate in a second rotational direction (e.g., a reverse direction associated with a reverse direction of travel of the vehicle 10), or selectively change between rotating in the first direction and rotating in the second direction. In some embodiments, the track motors 130 can each be independently controlled. By way of example, one track motor 130 may be driven in the forward direction while another track motor 130 is stationary. By way of another example, one track motor 130 may be driven in the forward direction while another track motor 130 is driven in the reverse direction (e.g., when turning). In some embodiments, the power output of the track motors 130 does not vary based on the direction of rotation of the track motors 130. Accordingly, the output power of the track motors 130 may remain the same, regardless of whether the vehicle 10 is traveling forward or in reverse.

In the embodiment of the rear tractive element 88 shown in FIGS. 1 and 4, the front wheel 118 and the center wheels 120 are pivotally coupled to the frame 12 (e.g., by bearings) such that the front wheel 118 and the center wheels 120 are free to rotate relative to the frame 12. Accordingly, the front wheel 118 and the center wheels 120 may act as idler wheels. The front wheel 118 and/or the center wheels 120 may engage the inner surface of the corresponding track 110, supporting the track 110 and rotating as the track 110 moves along the track path P.

Figure 20:
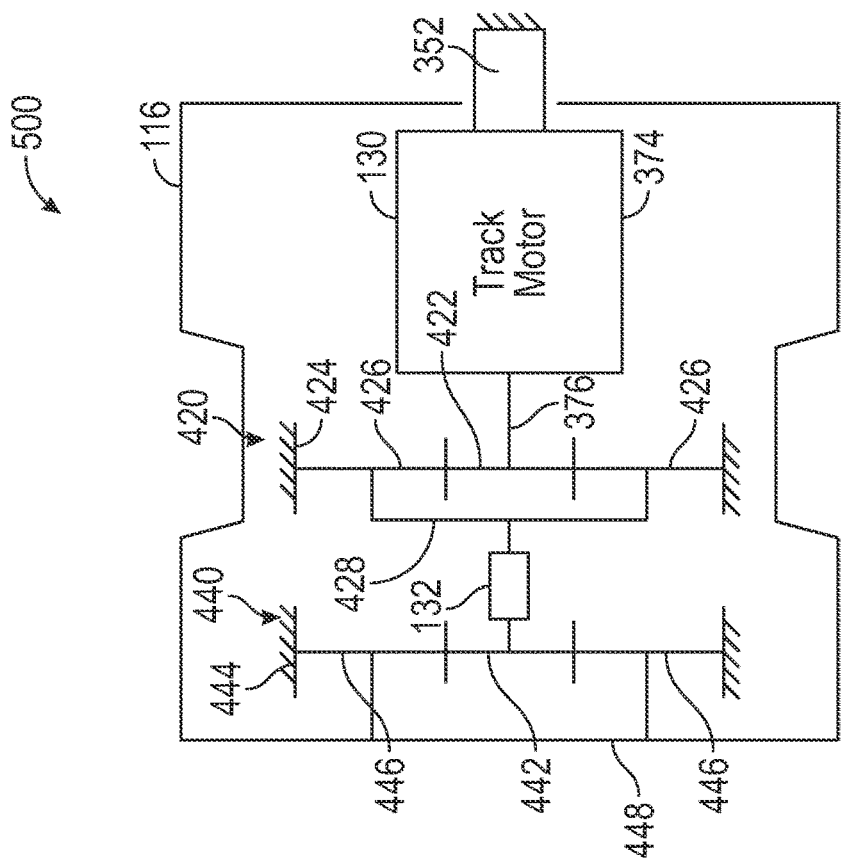
FIG. 20 is a schematic diagram of a drive module of the track assembly of FIG. 10, according to another exemplary embodiment.
Figure 21:
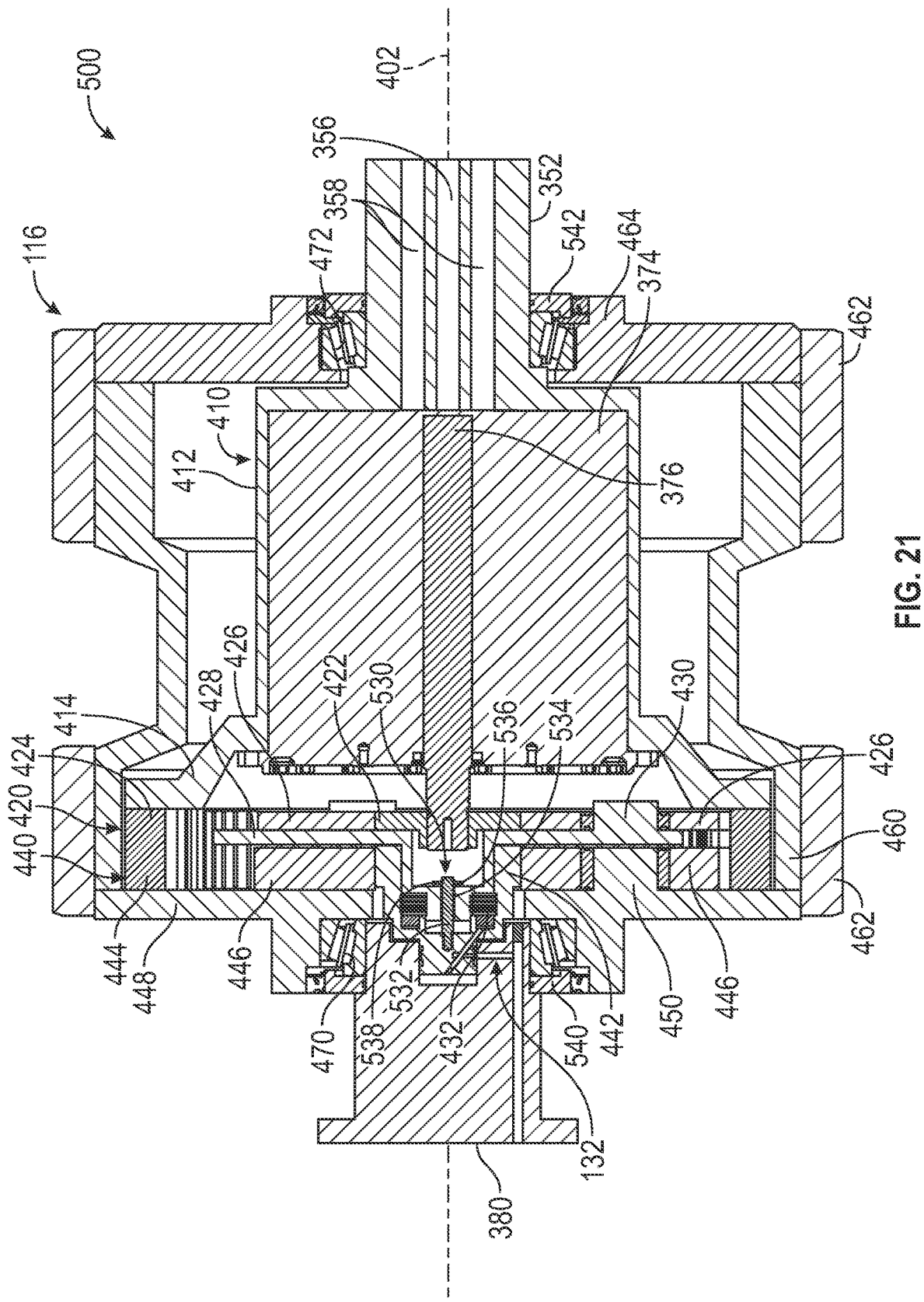
FIGS. 21 and 22 are front section views of the drive module of FIG. 20.
Figure 22:
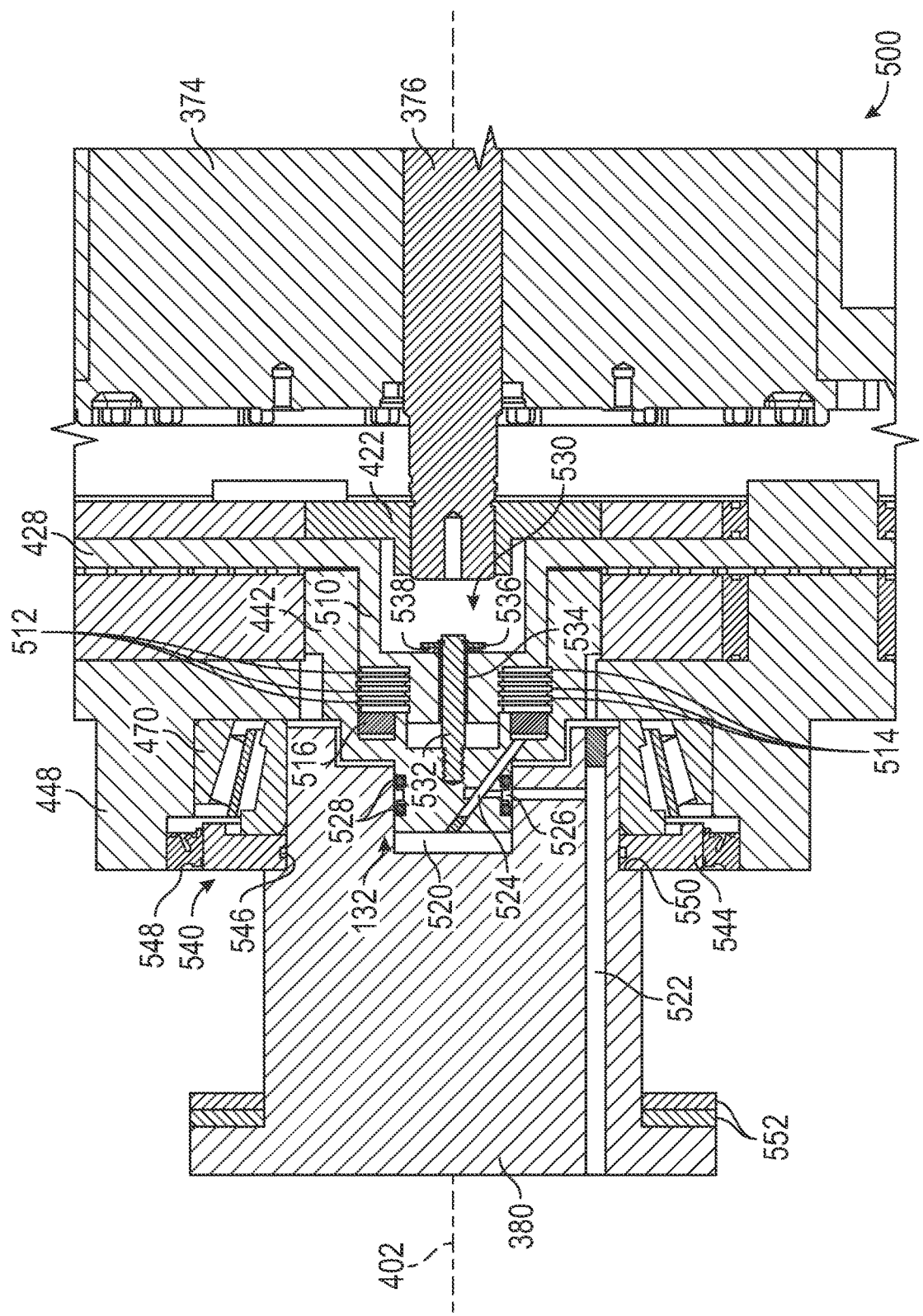

Referring to FIGS. 1, 3, and 4, each of the front tractive elements 78 and the rear tractive elements 88 include a clutch or selective coupler, shown as track clutch 132. One example of an arrangement including a track clutch 132 is shown in FIGS. 20-22. Each track clutch 132 is coupled to a track motor 130 and to a wheel of the corresponding track element. The track clutches 132 may be hydraulically, pneumatically, electronically, mechanically, or otherwise actuated (e.g., as controlled by the controller 210). Each track clutch 132 is positioned to selectively couple one of the track motors 130 to the corresponding track 110 (e.g., the track clutch 132 couples the track motor 130 to the track 110 when engaged and decouples the track motor 130 from the track 110 when disengaged). By way of example, as shown in FIGS. 1 and 3, the track clutch 132 of the rear tractive element 88 is positioned to selectively couple the track motor 130 to the rear wheel 116, thereby selectively coupling the track motor 130 to the track 110. When this track clutch 132 is disengaged, the rear wheel 116 and the track 110 may move independent of the track motor 130.

As shown in FIG. 1, the front tractive element 78 on the right side of the vehicle 10 utilizes a similar arrangement to the rear tractive element 88 on the right side of the vehicle 10. Specifically, the front tractive element 78 includes a continuous, annular drive element or tractive element (e.g., a belt, a track, etc.), shown as track 140, having lugs 142; a top wheel or drive wheel, shown as main drive wheel 144; a bottom wheel, drive wheel, or idler wheel, shown as rear wheel 146; a bottom wheel, drive wheel, or idler wheel, shown as front wheel 148; one or more bottom wheels, drive wheels, idler wheels, or support wheels, shown as center wheels 150; a track motor 130, and a track clutch 132. Any description of the track 110, the lugs 112, the main drive wheel 114, the rear wheel 116, the front wheel 118, and the center wheels 120 may apply to the track 140, the lugs 142, the main drive wheel 144, the rear wheel 146, the front wheel 148, and the center wheels 150, respectively, unless specified otherwise.

As shown in FIG. 1, in the front tractive element 78, the main drive wheel 144 is coupled to the front axle 76. Accordingly, the main drive wheel 144 transfers torque provided by the prime mover 52 through the front axle 76 to the track 140. The main drive wheel 144 may transfer mechanical energy from the front axle 76 to the track 140 to drive the track 140 to propel the vehicle 10. Additionally or alternatively, the main drive wheel 144 may transfer mechanical energy from the track 140 to the front axle 76 (e.g., that is transferred the braking system 100 and/or the prime mover 52) to provide a braking force on the track 140 and slow the vehicle 10.

Referring still to FIG. 1, the front tractive element 78 includes one track motor 130 that drives the track 140. This track motor 130 is coupled to the frame 12 and to the front wheel 148. The track motor 130 is configured to apply a torque to the front wheel 148. In some embodiments, the track motor 130 is operable in a first mode of operation and/or a second mode of operation. In the first mode of operation (e.g., a driving mode, etc.), the track motor 130 provides rotational mechanical energy to the front wheel 148, causing the front wheel 148 to rotate relative to the frame 12. Due to the engagement between the front wheel 148 and the corresponding track 140, the front wheel 148 transfers the mechanical energy from the track motor 130 to the track 140, causing the track 140 to move along the track path P and propel the vehicle 10. In the second mode of operation (e.g., a braking mode), the track motor 130 receives rotational mechanical energy from the front wheel 148, opposing rotation of the front wheel 148 relative to the frame 12. Due to the engagement between the front wheel 148 and the track 140, the front wheel 148 transfers mechanical energy from the track 140 to the track motor 130, opposing movement of the track 140 and braking the vehicle 10.

In the embodiment of the front tractive element 78 shown in FIG. 1, the rear wheel 146 and the center wheels 150 are pivotally coupled to the frame 12 (e.g., by bearings) such that the rear wheel 146 and the center wheels 150 are free to rotate relative to the frame 12. Accordingly, the rear wheel 146 and the center wheels 150 may act as idler wheels. The rear wheel 146 and/or the center wheels 150 may engage the inner surface of the track 140, supporting the track 110 and rotating as the track 140 moves along the corresponding track path.

As shown in FIGS. 1 and 3, the track clutch 132 of the front tractive element 78 is positioned to selectively couple the track motor 130 to the front wheel 148, thereby selectively coupling the track motor 130 to the track 140. When this track clutch 132 is disengaged, the front wheel 148 and the track 140 may move independent of the track motor 130.

In other embodiments, the front tractive elements 78 and/or the rear tractive elements 88 are otherwise configured with track motors 130. In some embodiments, the track motors 130 are omitted from certain tractive elements (e.g., the rear tractive elements 88 include track motors, but the front tractive elements 78 do not, etc.). In some embodiments, the track motors 130 are otherwise positioned within the tractive elements. By way of example, track motors 130 may be coupled (e.g., directly, indirectly through a track clutch 132) to the main drive wheel 114, the front wheel 118, the center wheels 120, the main drive wheel 144, the rear drive wheel 146, or the center wheels 120. In some embodiments, one or more of the tractive elements includes multiple track motors 130. By way of example, the rear tractive element 88 may include a track motor 130 coupled to the rear wheel 116, a track motor 130 coupled to the front wheel 118, and a track motor 130 coupled to one of the center wheels 120. In some embodiments, a track motor 130 is coupled to multiple wheels. By way of example, a track motor 130 may be coupled to all of the center wheels 120 of a rear tractive element 88. In each of these embodiments, the track motors 130 may be coupled to the corresponding wheels by a track clutch 132, or the track clutch 132 may be omitted such that the track motor 130 is directly coupled to the corresponding wheel. In some embodiments, the vehicle includes track motors 130 of different sizes (e.g., have a different physical size, output power, output torque, etc.).

Figure 5:
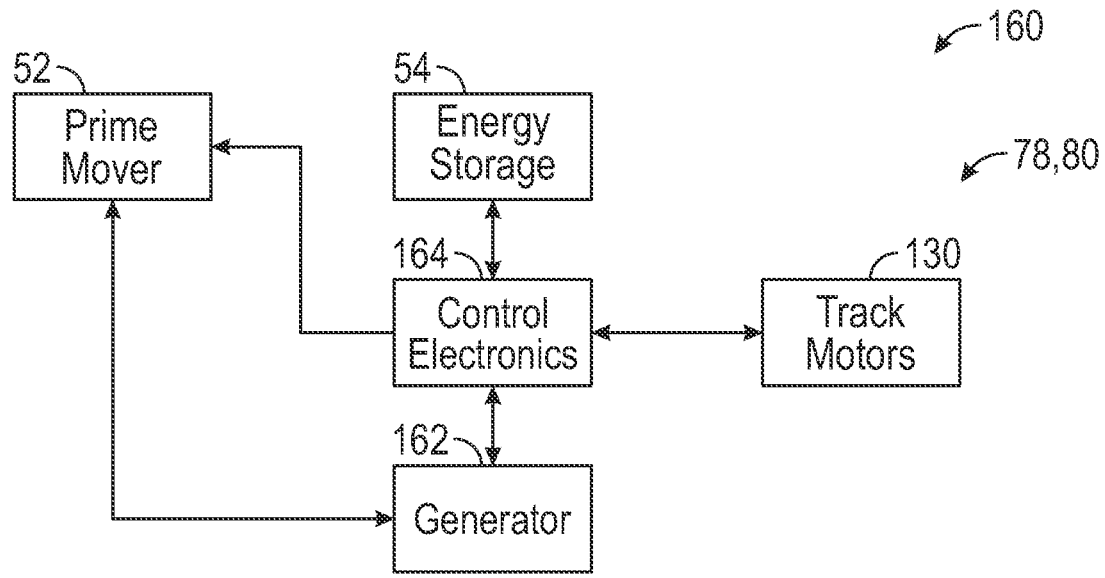
FIG. 5 is a schematic block diagram of an electrical system of the vehicle of FIG. 1, according to an exemplary embodiment.

Referring to FIG. 5, the electrical system 160 of the vehicle 10 is shown according to an exemplary embodiment. In some embodiments, the electrical system 160 distributes electrical energy throughout the vehicle 10. By way of example, the electrical system 160 may provide electrical energy to the track motors 130 (e.g., to propel the vehicle 10) and/or receive electrical energy from the track motors 130 (e.g., when braking). The prime mover 52 is coupled to an electromagnetic device or motor/generator (e.g., an alternator), shown as generator 162. In some embodiments, the generator 162 receives mechanical energy from the prime mover 52 (e.g., from a rotating shaft of the prime mover 52) and generates electrical energy.

As shown in FIG. 5, the prime mover 52, the energy storage 54, the track motors 130, and the generator 162 are indirectly electrically coupled to one another through power control electronics (e.g., switches, relays, contactors, inverters, rectifiers, converters, etc.), shown as control electronics 164, that control or condition the electrical energy passing through the electrical system 160. The control electronics 164 may control the operational speed and/or direction of rotation of the track motors 130. In some embodiments, the control electronics 164 convert electrical energy between alternating current (AC) and direct current (DC). In some embodiments, the control electronics 164 control the voltage, current, and/or frequency of the electrical energy. In some embodiments, the control electronics 164 selectively electrically couple the components of the electrical system 160 to one another. By way of example, the control electronics 164 that selectively electrically decouple the track motors 130 from one or more other components of the electrical system 160 (e.g., to electrically isolate one or more of the track motors 130).

Figure 6:
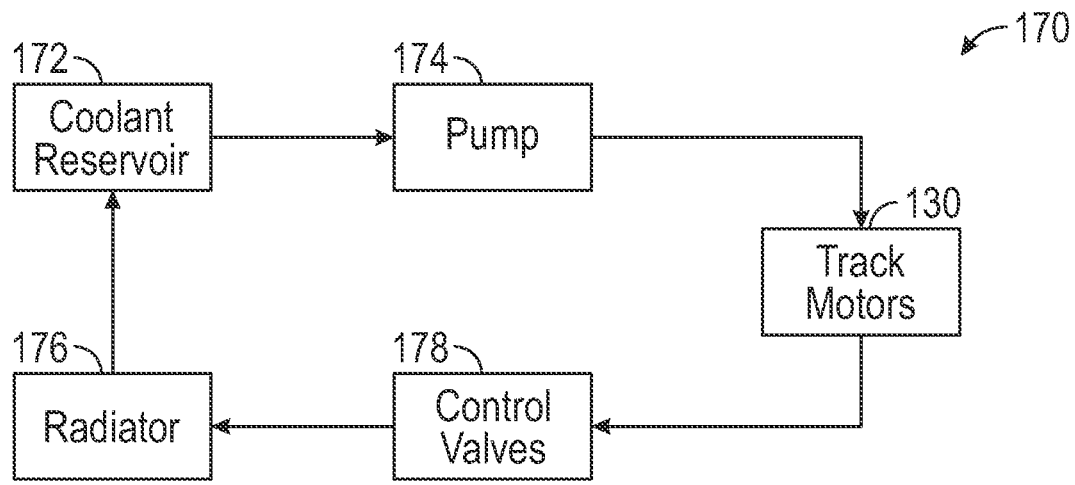
FIG. 6 is a schematic block diagram of a coolant system of the vehicle of FIG. 1, according to an exemplary embodiment.

Referring to FIG. 6, the coolant system 170 is shown according to an exemplary embodiment. In some embodiments, the coolant system 170 regulates or otherwise controls the temperature of components of the vehicle 10. Specifically, the coolant system 170 is fluidly coupled to and regulates the temperature of the track motors 130. In some embodiments, the coolant system 170 accomplishes this by providing flows of coolant (e.g., a fluid) to the track motors 130 at a relatively low temperature. The fluid passes through the track motors 130, absorbing thermal energy, which is then dissipated by the coolant system 170. The coolant system 170 includes a container, reservoir, or tank, shown as coolant reservoir 172, containing a volume of coolant. An outlet of the coolant reservoir 172 is fluidly coupled to a pump 174, which is in turn fluidly coupled to an inlet of each track motor 130. The pump 174 transports coolant from the coolant reservoir 172 to the track motors 130. A heat dissipater, heat sink, or heat exchanger, shown as radiator 176, is fluidly coupled to the track motors 130 and the coolant reservoir 172, forming a loop or circuit for the flow of coolant. The radiator 176 receives heated coolant from the track motors 130, dissipates thermal energy from the coolant to the surrounding atmosphere, and returns the coolant to the coolant reservoir 172 at a relatively low temperature. In some embodiments, one or more flow control valves or flow control elements, shown as control valves 178, regulate or otherwise control the flow of fluid through the coolant system 170. By way of example, the control valves 178 may control which of the track motors 130 receive the coolant. By way of another example, the control valves 178 may control the flow rate of coolant through each track motor 130. In other embodiments, the control valves 178 and/or the pump 174 are otherwise positioned within the coolant system 170.

Figure 7:
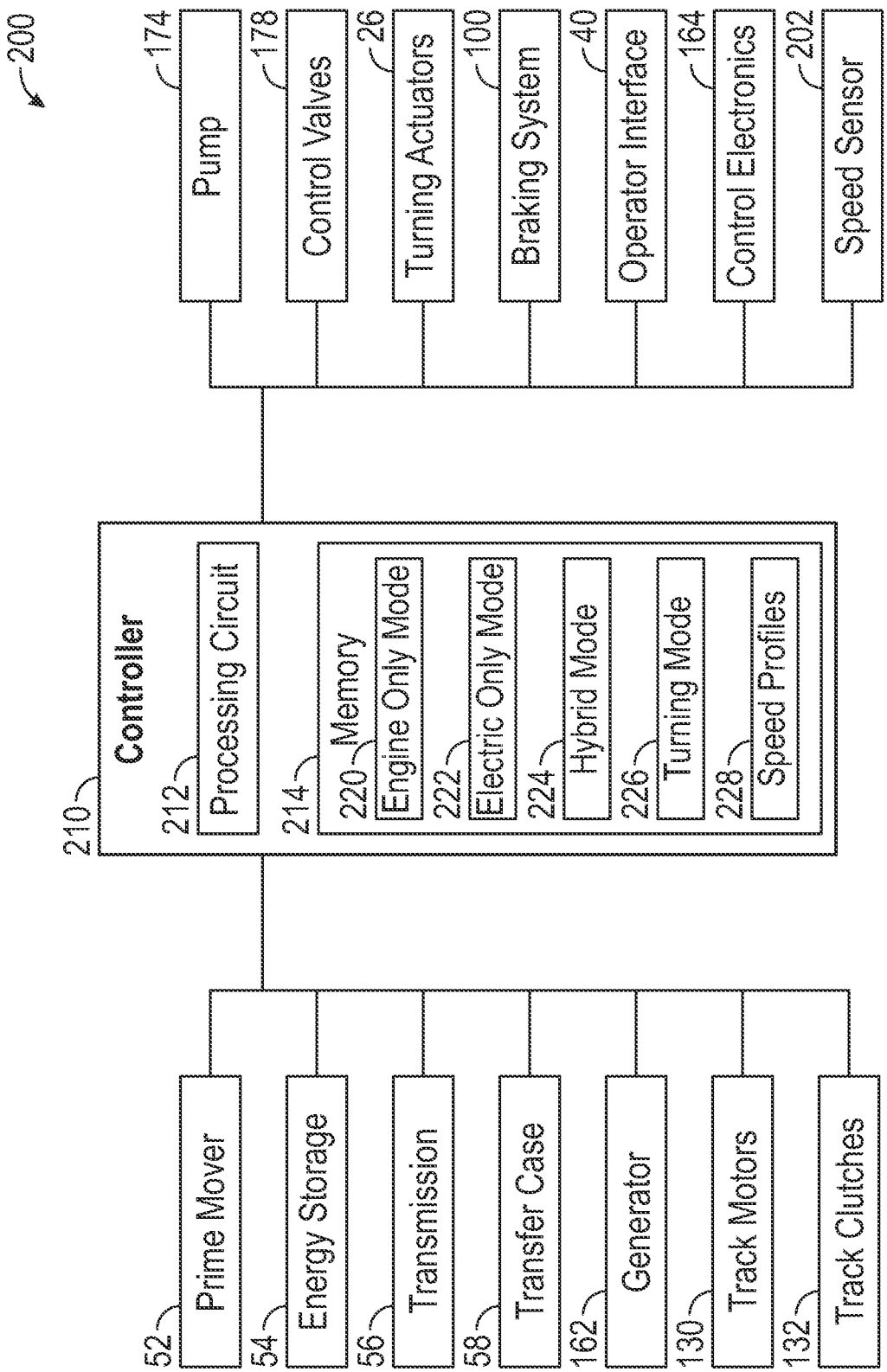
FIG. 7 is a schematic block diagram of a control system of the vehicle of FIG. 1, according to an exemplary embodiment.

Referring to FIG. 7, the control system includes a vehicle controller, shown as controller 210. The controller 210 is configured to control the operation of various components of the vehicle 10. The controller 210 may receive information (e.g., sensor data, user inputs, etc.) or provide information (e.g., commands, etc.) to a variety of components to facilitate operation of the vehicle 10. According to the exemplary embodiment of FIG. 7, the controller 210 is operatively coupled to the prime mover 52, the energy storage 54, the transmission 56, the transfer case 58, the generator 162, the track motors 130, the track clutches 132, the pump 174, the control valves 178, the turning actuators 26, the braking system 100, the operator interface 40, and the control electronics 164. In other embodiments, the controller 210 is operatively coupled to different components.

In some embodiments, the controller 210 is configured to provide information (e.g., commands) to control the prime mover 52 (e.g., activating or deactivating the prime mover 52, controlling the output power, etc.), the energy storage 54 (e.g., controlling the rate of discharge, etc.), the transmission 56 (e.g., controlling shifting, etc.), the transfer case 58 (e.g., controlling engagement of the front output 60 and the rear output 62, etc.), the generator 162 (e.g., controlling the output power, etc.), the track motors 130 (e.g., controlling the output speed or output power, controlling whether the track motors 130 are braking or driving, etc.), the track clutches 132 (e.g., engaging or disengaging the track clutches 132, etc.), the pump 174 (e.g., controlling the output flow rate, etc.), the control valves 178 (e.g., controlling flow rate or direction, etc.), the turning actuators 26 (e.g., controlling the extended lengths of the turning actuators 26, etc.), the braking system 100 (e.g., to provide a braking force, etc.), the operator interface 40 (e.g., to provide specific information to the operator, etc.), and/or the control electronics 164 (e.g., to control the voltage, current, or direction of electrical energy passing through the electrical system 160, etc.). The controller 210 may provide electrical signals, pneumatic signals (e.g., by controlling a valve or compressor), hydraulic signals (e.g., by controlling a valve or pump), or mechanical signals (e.g., by applying a force to a linkage or cable, etc.) to facilitate control of the vehicle 10. By way of example, the controller 210 may control a valve to direct a flow of pressurized oil to a track clutch 132 to engage the track clutch 132.

In some embodiments, the controller 210 is configured to receive information from the prime mover 52 (e.g., engine speeds, engine temperatures, etc.), the energy storage 54 (e.g., a charge level of a battery, a fill level of a fuel tank, etc.), the transmission 56 (e.g., the current gear, etc.), the transfer case 58 (e.g., which of the front output 60 and the rear output 62 are engaged, etc.), the generator 162 (e.g., how much output power is being produced, etc.), the track motors 130 (e.g., the current output speed or output power, etc.), the track clutches 132 (e.g., the current engaged/disengaged state, etc.), the pump 174 (e.g., the current output flow rate, etc.), the control valves 178 (e.g., a flow rate of coolant through a portion of the coolant system 170, etc.), the turning actuators 26 (e.g., the current extended lengths of the turning actuators 26, etc.), the braking system 100 (e.g., the current engaged/disengaged state, etc.), the operator interface 40 (e.g., commands provided by an operator, etc.), and/or the control electronics 164 (e.g., the voltage, current, or direction of electrical energy passing through the electrical system 160, etc.). Each of these components may include sensors to facilitate transferring information to the controller 210.

The control system 200 further includes a sensor (e.g., a vehicle speed sensor), shown as speed sensor 202, that is operatively coupled to the controller 210. The speed sensor 202 is positioned to measure a speed of the vehicle 10 and provides a signal indicative of this speed to the controller 210. By way of example, the speed sensor 202 may measure a rotational speed of the prime mover 52, a component of one of the tractive elements (e.g., the main drive wheel 114, the center wheels 120, the track 110, etc.), or a component that couples the prime mover 52 to the tractive elements (e.g., the transmission 56, the front axle 76, etc.). In one such embodiment, the control system 200 includes multiple speed sensors 202, each of which measures a speed of one of the tractive elements. By way of another example, the speed sensor 202 may include a global positioning system (GPS) that measures the movement speed of the vehicle 10 relative to the Earth.

The controller 210 includes a processing circuit 212 and a memory 214. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212.

Operating Modes

According to an exemplary embodiment, the memory 214 is configured to store various operational profiles that describe the control logic used to operate the vehicle 10 according to various modes of operation (i.e., operating modes). According to the exemplary embodiment shown in FIG. 7, the memory 214 stores operational profiles describing control logic for operating the vehicle 10 in a prime mover only mode, shown as engine only mode 220; an electric only mode 222; a hybrid mode 224; and a turning mode 226, in which the driveline 50 is operated to propel the vehicle 10.

According to an exemplary embodiment, in the engine only mode 220, the controller 210 operates the prime mover 52 to propel and/or brake the vehicle 10. In the engine only mode 220, the vehicle 10 may operate without using the track motors 130 to propel or brake the vehicle 10 (e.g., without the track motors 130 applying a driving force or a braking force to the tracks 110 or the tracks 140). According to an exemplary embodiment, an energy flow path in the engine only mode 220 includes: the prime mover 52 supplying rotational mechanical energy to the transmission 56; the transmission 56 and the transfer case transferring a first portion of the mechanical energy to front drive shaft 72 and a second portion of the mechanical energy to the rear drive shaft 82; the front differential 74 and the front axle 76 transferring the first portion of the mechanical energy to the front tractive elements 78; and the rear differential 84 and the rear axle 86 transferring the second portion of the mechanical energy to the rear tractive elements 88. In some embodiments, while in the engine only mode 220, one or more of the track clutches 132 may be disengaged to isolate the track motors 130 from the corresponding tracks, permitting free movement of the driveline 50 (e.g., under power of the prime mover 52, due to momentum of the vehicle 10, etc.) without the track motors 130 being driven. This decoupled configuration may reduce wear on the track motors 130 and prevent overspeeding of the track motors 130. In some embodiments, while in the engine only mode 220, the controller 210 may electrically isolate the track motors 130 such that an open circuit is formed with the track motors 130. This may reconfigure the track motors 130 into a "neutral" configuration, in which the track motors 130 impart minimal (e.g., negligible) forces on the track 130.

The engine only mode 220 may facilitate operation of the vehicle 10 in situations where the mechanical energy from the track motors 130 is not needed or desired (e.g., in a situation where the power output of the prime mover 52 is sufficient to operate the vehicle 10 without the track motors 130, etc.). The engine only mode 220 may facilitate operation of the vehicle 10 in situations where operation of the track motors 130 is not desired (e.g., in a situation where one of the track motors 130 has experienced a fault, in a situation where the energy storage 54 drops below a threshold stored energy level (e.g., a charge level of batteries within the energy storage 54 drops below a threshold charge level), etc.).

According to an exemplary embodiment, in the electric only mode 222, the controller 210 operates the track motors 130 to propel and/or brake the vehicle 10. In the electric only mode 222, the vehicle 10 may operate without exchanging mechanical energy between the prime mover 52 and the front tractive elements 78 or the rear tractive elements 88 to propel or brake the vehicle 10. According to an exemplary embodiment, an energy flow path in the electric only mode 222 includes each track motor 130 providing mechanical energy directly to the track of the corresponding front tractive element 78 or rear tractive element 88 to propel the vehicle 10. By way of example, the controller 210 may reconfigure (e.g., shift) the transmission 56 and/or the transfer case 58 into a neutral configuration in which the prime mover 52 is decoupled from the front drive shaft 72 and the rear drive shaft 82. In the electric only mode 222, the front axle 76 and the rear axle 86 (and thus the front tractive elements 78 and the rear tractive elements 88) may move freely, independent of the prime mover 52. In some embodiments, the prime mover 52 drives the generator 162 to produce electrical energy (e.g., to power the track motors 130) while in the electric only mode 222.

The electric only mode 222 may reduce the emissions of the vehicle 10 compared to modes where the prime mover 52 is operated (e.g., if the prime mover 52 includes an internal combustion engine). The electric only mode 222 may facilitate operation of the vehicle 10 in situations where the mechanical energy from the prime mover 52 to the front tractive elements 78 and the rear tractive elements 88 is not needed or desired (e.g., in a situation where the power output of the track motors 130 is sufficient to operate the vehicle 10 without the prime mover 52, etc.). The electric only mode 222 may facilitate operation of the vehicle 10 in situations where operation of the prime mover 52 is not desired (e.g., in a situation where part of the driveline 50 has experienced a fault, in a situation where the energy storage 54 drops below a threshold stored energy level (e.g., a fuel level of a fuel tank within the energy storage 54 drops below a threshold fuel level), etc.). Advantageously, the electric only mode 222 may facilitate a high-speed reverse operation (i.e., propelling the vehicle 10 at high speeds in a reverse direction). Because the power output of the track motors 130 is independent of the direction of rotation, the track motors 130 are better suited to high-speed reverse operation than a prime mover 52 that relies on specific reverse gears in the transmission 56 for reverse operation. Accordingly, the vehicle 10 may be operable at equivalent forward speeds and reverse speeds in the electric only mode 222.

According to an exemplary embodiment, in the hybrid mode 224, the controller 210 operates the prime mover 52 and the track motors 130 to propel and/or brake the vehicle 10. In the hybrid mode 224, the controller 210 may (a) engage the track clutches 132 and (b) control the transmission 56 and/or the transfer case 58 to couple the prime mover 52 to the front drive shaft 72 and/or the rear drive shaft 82. The hybrid mode 224 may reduce the emissions of the vehicle 10 compared to modes where only the prime mover 52 is operated (e.g., the engine only mode 220). The hybrid mode 224 may facilitate operation of the vehicle 10 in situations a high power output is desired, as both the prime mover 52 and the track motors 130 can provide output power simultaneously.

According to an exemplary embodiment, in the turning mode 226, the controller 210 operates the various systems of the vehicle 10 to turn the vehicle 10 using the track motors 130. This turning may supplement the turning provided by the turning actuators 26. The turning mode 226 may offer enhanced turning (e.g., a smaller turning radius) relative to other methods of steering (e.g., use of the turning actuators 26). The controller 210 may operate the vehicle 10 in the turning mode 226 simultaneously with the electric only mode 222 or the hybrid mode 224.

In some embodiments, in the turning mode 226, the controller 210 controls the track motors 130 to drive the tractive elements on a first side of the vehicle 10 (e.g., the left side, the right side) and the tractive elements on a second, opposite side of the vehicle 10 at different speeds. By way of example, the controller 210 may control the total output power of the track motors 130 on a first side of the vehicle 10 (e.g., the left side, the right side) to be greater than the total output power of the track motors 130 on a second, opposite side of the vehicle 10. By way of another example, the controller 210 may perform closed-loop control using the speed sensor 202 to control the speed of the tracks on the first side of the vehicle 10 to be greater than the speed of the tracks on the second side of the vehicle 10. By way of another example, the controller 210 may control the track motors 130 on the first side of the vehicle 10 to apply a braking force to one or more of the tracks on the first side. In such an example, the controller 210 may control the track motors 130 on the second side of the vehicle 10 to propel the second side of the vehicle 10. Additionally or alternatively, the controller 210 may propel the vehicle 10 using the prime mover 52. When the braking force is applied by the track motors 130 to the first side of the vehicle 10, the front differential 74 and/or the rear differential 84 may direct mechanical energy from the prime mover 52 to the tractive elements on the second side of the vehicle 10, increasing the speed of the tractive elements on the second side of the vehicle 10.

In some embodiments, the vehicle 10 is configured to utilize the track motors 130 to perform independent control of the tractive elements on the first side and second side of the vehicle (e.g., skid steer turning, zero radius turning, etc.). By way of example, the controller 210 may control the track motors 130 to drive the tractive elements on the first side of the vehicle 10 in a first direction (e.g., forward, reverse) while driving the tractive elements on the second side of the vehicle 10 in a second, opposite direction. By way of another example, the controller 210 may control the track motors 130 to drive the tractive elements on the first side of the vehicle 10 in a first direction (e.g., forward, reverse) while the tractive elements on the second side of the vehicle 10 are held stationary. The controller 210 may vary the turning radius of the vehicle 10 by varying the relative speeds of the tractive elements on the first and second sides. In some embodiments, the tractive elements are driven at the same speed, but in opposite directions, such that the vehicle 10 turns about its center (e.g., a zero radius turn). In some embodiments, the controller 210 may reconfigure (e.g., shift) the transmission 56 and/or the transfer case 58 into a neutral configuration in which the prime mover 52 is decoupled from the front drive shaft 72 and the rear drive shaft 82 while performing skid steer turning. This may facilitate driving the tractive elements in a reverse direction without backdriving the prime mover 52.

Figure 8:
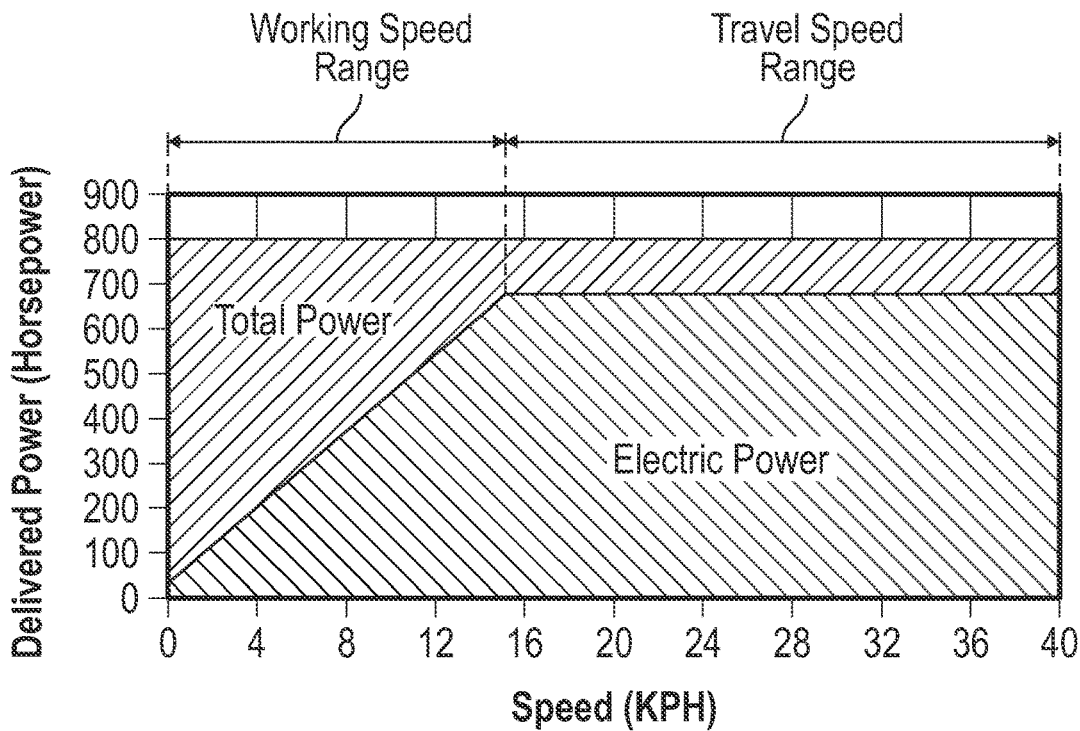
FIG. 8 is a graph illustrating the power output of the vehicle of FIG. 1, according to an exemplary embodiment.
Figure 9:
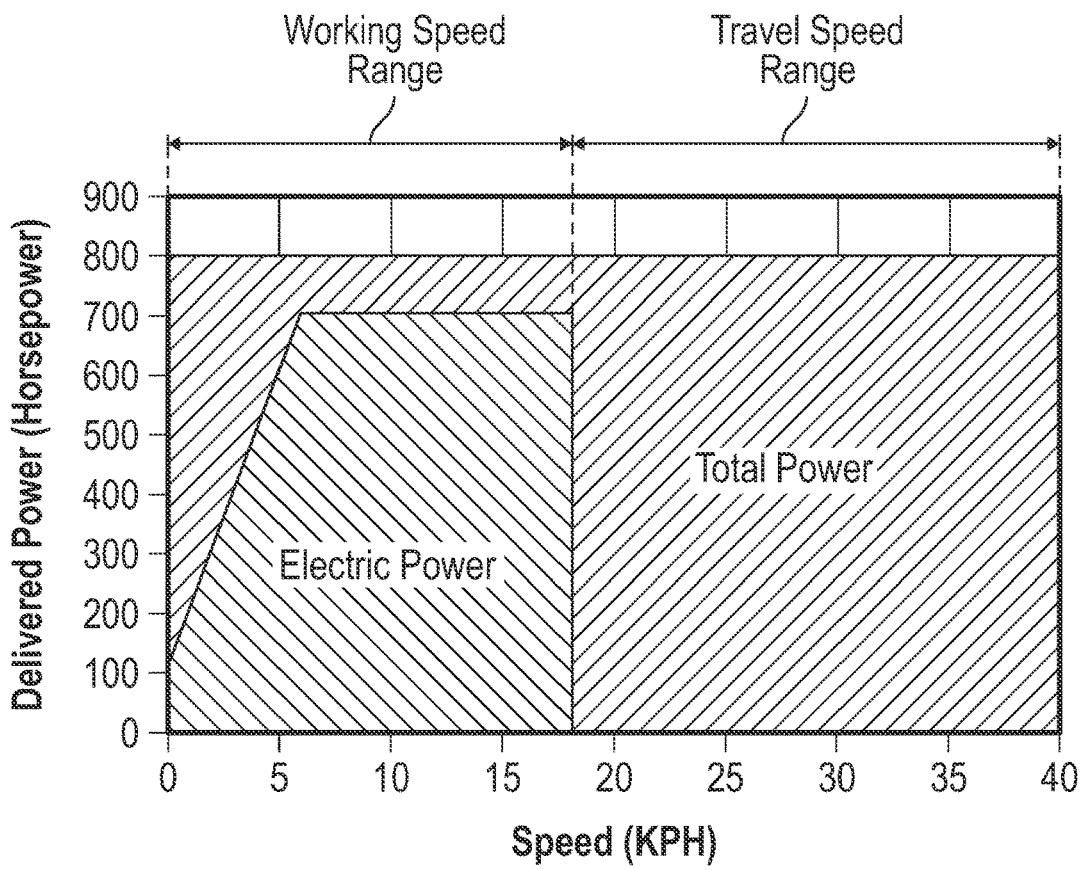
FIG. 9 is a graph illustrating the power output of the vehicle of FIG. 1, according to another exemplary embodiment.

Referring to FIGS. 8 and 9, in some embodiments, the front tractive elements 78 and/or the rear tractive elements 88 are configured to utilize the track motors 130 within a specific speed range of the of the vehicle 10. FIGS. 8 and 9 illustrate both the total power delivered to propel the vehicle 10 (e.g., the sum of the power delivered by the prime mover 52 and the power delivered by the track motors 130) and the electric power delivered to propel the vehicle 10 (e.g., the total power delivered by the track motors 130) at various speeds, according to various embodiments. In the embodiments of FIGS. 8 and 9, the total power delivered is set to 800 horsepower (e.g., by the controller 210), regardless of the speed of the vehicle 10. In other embodiments, the power/speed profile of the vehicle 10 differs. By way of example, the total delivered power may vary between different vehicle speeds.

FIGS. 8 and 9 also illustrate a first speed range (e.g., a jobsite speed range, a low speed range, etc.), shown as a working speed range, and a second speed range (e.g., a driving speed range, a transit speed range, a roading speed range, a high speed range, etc.), shown as a travel speed range. The working speed range is lower than the travel speed range. In some embodiments, the working speed range extends from a lower bound or threshold speed (e.g., 0 kilometers per hour (KPH), 1 KPH, etc.) to an upper bound or threshold speed (e.g., 14 KPH, 17 KPH, 19 KPH, etc.). In some embodiments, the travel speed range extends from a lower bound or threshold speed (e.g., 14 KPH, 17 KPH, 19 KPH, etc.) to an upper bound or threshold speed (e.g., a top speed of the vehicle 10, 40 KPH, etc.). In some embodiments, the upper bound of the working speed range is equal to the lower bound of the travel speed range.

It may be desirable for the vehicle 10 to operate primarily within the working speed range when on a jobsite performing various tasks (e.g., when towing or pushing an implement that is engaged with the ground (e.g., for tilling, planting, or harvesting) or supporting a payload (e.g., seed, fertilizer, etc.), etc.). Such tasks may require a relatively large torque be delivered to propel the vehicle 10 (e.g., to overcome forces resisting movement of the vehicle 10). It may be desirable for the vehicle 10 to operate primarily within the travel speed range when traveling between jobsites or across a jobsite. When traveling, a relatively low torque may be required to move the vehicle 10 (e.g., because the vehicle 10 is not towing an implement that is engaged with the ground), so the speed of the vehicle 10 may be greater for a given total delivered power. Additionally, when traveling between or across jobsites, the vehicle 10 may cross surfaces (e.g., paved roads, packed dirt trails, etc.) that are smooth relative to surfaces that may be experienced when working on a jobsite (e.g., fields), facilitating movement at high speeds.

FIG. 8 illustrates the power delivered by the driveline 50 of the vehicle 10 at different speeds, according to an exemplary embodiment. This configuration (e.g., a clutchless configuration) may be utilized regardless of whether the track clutch 130 is omitted. In this configuration, the track motors 130 are utilized in both the working speed range and the travel speed range. As shown, the track motors 130 begin providing the electric power when the vehicle 10 is stationary, and the electric power increases linearly with speed (e.g., the output torque of each track motor 130 may remain relatively constant) until the vehicle 10 reaches a threshold speed. In some embodiments, the electrical power provided by the track motors 130 is approximately half of the maximum output power in the working speed range. When the speed of the vehicle 10 exceeds the threshold speed, the electric power output by the track motors 130 remains substantially constant (e.g., at a maximum electric power). In some embodiments, the threshold speed is the upper bound of the working speed range and the lower bound of the travel speed range. Accordingly, this configuration may be well-suited to supplying electric power when the vehicle 10 is operating in the travel speed range. In some embodiments, the transmission 56 includes a CVT coupled to the prime mover 52 (e.g., an internal combustion engine). In some embodiments, the CVT reaches peak efficiency at lower to moderate speeds (e.g., below the upper bound of the working speed range, between 14 and 19 KPH, etc.). It may be advantageous to pair a CVT with the track motor 130 configuration of FIG. 8, as the prime mover 52 provides the majority of the total power at low speeds where the CVT is more efficient, and the track motors 130 provide the majority of the total power at high speeds where the CVT is less efficient.

The track motor 130 and/or the power transmission components that couple the track motor 130 to the track may be sized to facilitate operation within the travel speed range (e.g., such that the track motor 130 can operate within the travel speed range without failing or wearing excessively, such that the track motor 130 operates at maximum output power within the travel speed range, such that the track motor 130 operates at maximum efficiency within the travel speed range, etc.). In the configuration of the track motor 130 shown in FIG. 8, the track clutch 132 may be omitted, as the track motor 130 is configured to operate in both the working speed range and the travel speed range, and there is minimal chance of overspeeding the track motors 130. By way of example, the drive module 400 shown in FIG. 19 may utilize the power-speed relationship shown in FIG. 8

FIG. 9 illustrates the power delivered by the driveline 50 of the vehicle 10 at different speeds, according to another exemplary embodiment. This configuration (e.g., a clutched configuration) may be utilized in embodiments that include the track clutch 132. In this configuration, the track motors 130 are utilized in the working speed range, but do not supply electric power to the driveline 50 in the travel speed range. As shown, the track motors 130 begin providing the electric power when the vehicle is stationary, and the electric power increases linearly with speed until the vehicle 10 reaches a first threshold speed. When the speed of the vehicle 10 exceeds the first threshold speed, the electric power output by the track motors 130 remains substantially constant (e.g., at a maximum electric power) until the speed reaches a second threshold speed. At speeds greater than the second threshold speed, the track motors 130 cease to provide electric power to the driveline 50. In some embodiments, the second threshold speed is an upper limit speed of the working speed range and a lower limit speed of the travel speed range. Accordingly, this configuration may be well-suited to supplying electric power when the vehicle 10 is operating in the working speed range.

In some embodiments, the controller 210 disengages the track clutch 132 in response to the vehicle 10 reaching the second threshold speed. The controller 210 may utilize the speed sensor 202 to determine the speed of the vehicle 10. By disengaging the track clutch 132, the track motor 130 is decoupled from the corresponding track. This may prevent overspeeding the track motor 130. In some embodiments, in response to the vehicle 10 reaching the second threshold speed, the controller 210 electrically isolates the track motor 130 such that an open circuit is formed with the track motor 130. This may reconfigure the track motor 130 into a "neutral" configuration, in which the track motor 130 imparts minimal (e.g., negligible) forces on the corresponding track.

The track motor 130 and/or the power transmission components that couple the track motor 130 to the corresponding track may be sized to facilitate operation within the working speed range (e.g., such that the track motor 130 can operate within the working speed range without failing or wearing excessively, such that the track motor 130 operates at maximum output power within the working speed range, such that the track motor 130 operates at maximum efficiency within the working speed range, etc.). In the configuration of the track motor 130 shown in FIG. 9, the track clutch 132 may advantageously be used by the controller 210 to prevent the track motor 130 from overspeeding when the vehicle 10 exceeds the working speed range. By way of example, the drive module 500 shown in FIG. 20 may utilize the power-speed relationship shown in FIG. 9.

In some embodiments, the vehicle 10 includes both (a) one or more track motors 130 utilizing the power-speed relationship shown in FIG. 8 (e.g., track motors 130 in a high-speed configuration) and (b) one or more track motors 130 utilizing the power-speed relationship shown in FIG. 9 (e.g., track motors 130 in a low-speed configuration). In some such embodiments, a single tractive element includes both (a) a track motor 130 in a high-speed configuration and (b) a track motor 130 in a low-speed configuration. In other such embodiments, the high-speed and low-speed track motors 130 are spread between multiple tractive elements. It may be advantageous to include both high-speed configuration and low-speed configuration track motors 130. By way of example, when operating in the working speed range, the low-speed track motors 130 may be used as the main source of electric power. While the high-speed track motors 130 may not be capable of providing large amounts of electric power within the working speed range, the low-speed track motors 130 may operate at or near maximum power output in the working speed range. By way of another example, when operating in the travel speed range, the high-speed track motors 130 may be used as the main source of electric power. To avoid overspeeding the low-speed track motors 130, the track clutches 132 of the low-speed track motors may be disengaged. However, the high-speed track motors 130 may operate at or near maximum power output in the travel speed range. Accordingly, by including both high-speed track motors 130 and low-speed track motors 130, the vehicle 10 may facilitate operating at maximum electric power output within both the working speed range and the travel speed range.

Track Assembly

Figure 10:
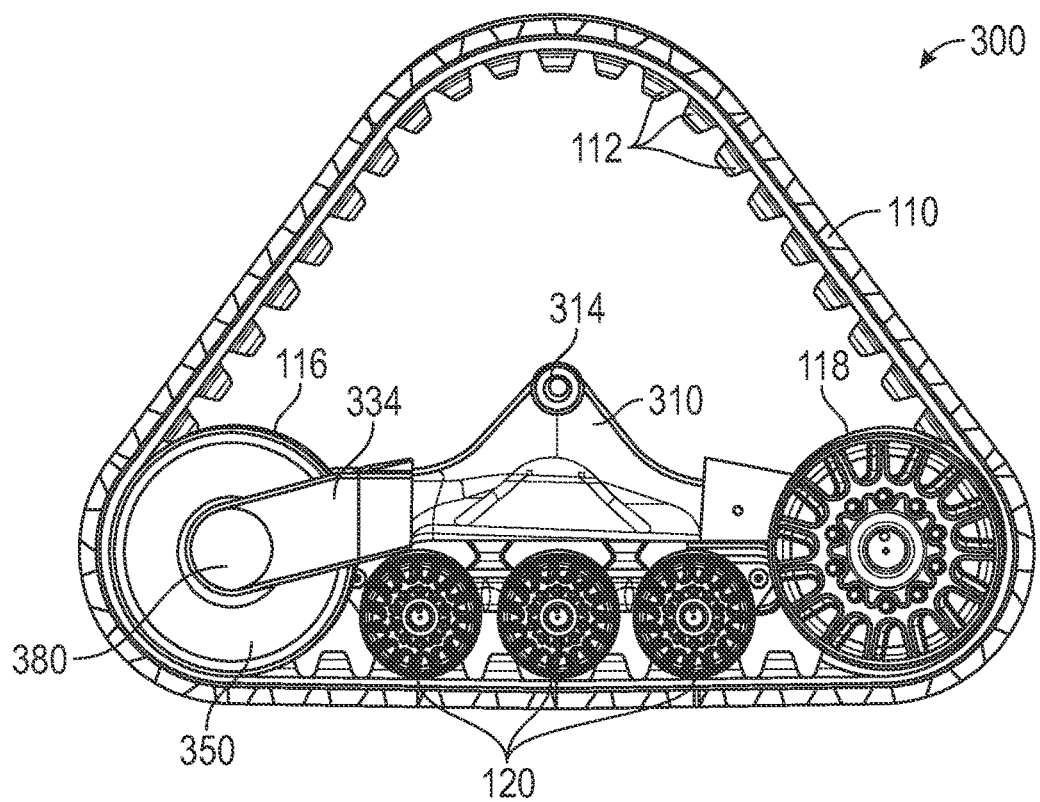
FIG. 10 is a right side view of a track assembly of the rear tractive element of FIG. 4, according to an exemplary embodiment.
Figure 11:
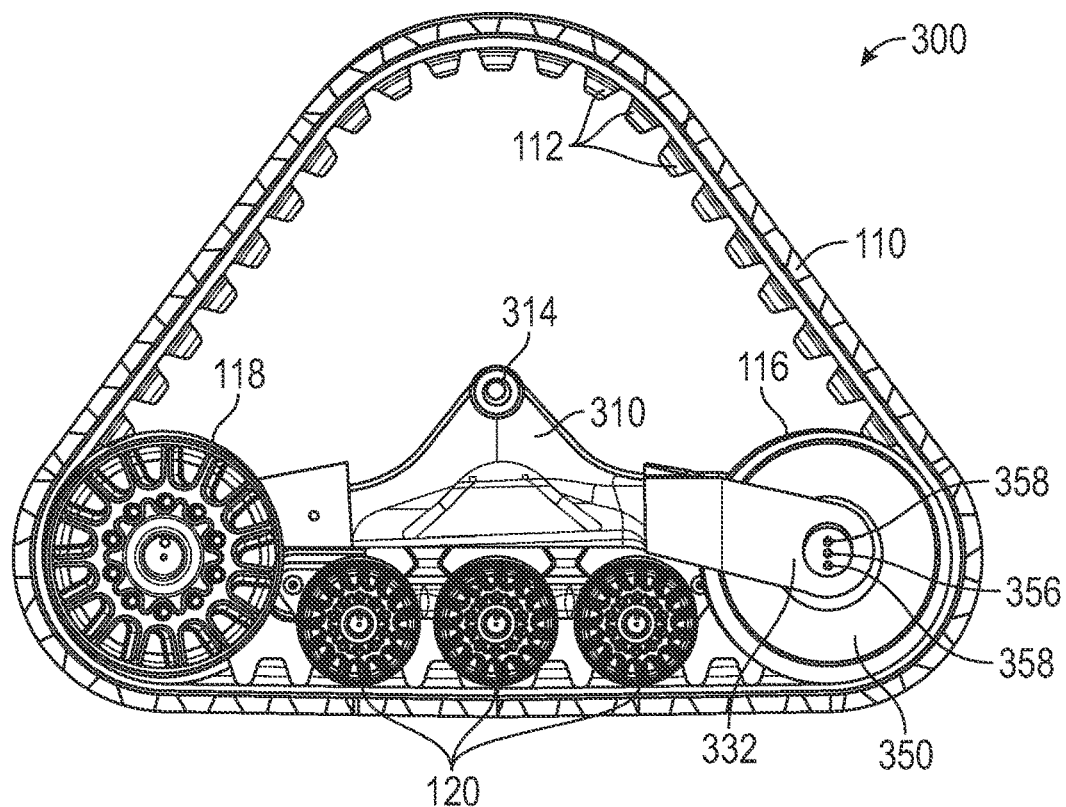
FIG. 11 is a left side view of the track assembly of FIG. 10.

Referring to FIGS. 4, 10, and 11, the rear tractive element 88 on the right side of the vehicle 10 includes a tractive element assembly, shown as track assembly 300. The rear tractive element 88 on the left side of the vehicle 10 may also include a track assembly 300. The track assembly 300 includes the track 110; the main drive wheel 114; the front wheel 118; the center wheels 120; a support, chassis, or frame, shown as track frame 310; and a wheel assembly, drive assembly, or electric drive module, shown as drive module 350, that includes the rear wheel 116 and the track motor 130. In some embodiments, the drive module 350 includes the track clutch 132. In other embodiments, the track clutch 132 is omitted from the drive module 350.

The front tractive elements 78 incorporate certain features of the track assembly 300 and may be substantially similar to the rear tractive elements 88. Accordingly, any description of the track assembly 300 may apply to the front tractive elements 78, unless specified otherwise. For example, any description of the track 110, the lugs 112, the main drive wheel 114, the rear wheel 116, the front wheel 118, and the center wheels 120 may apply to the track 140, the lugs 142, the main drive wheel 144, the rear wheel 146, the front wheel 148, and the center wheels 150, respectively, except as otherwise specified.

Referring to FIGS. 4 and 10-12, the track frame 310 is shown according to an exemplary embodiment. The track frame 310 couples the drive module 350, the front wheel 118, and the center wheels 120 to the frame 12 and the body 20 of the vehicle 10. The track frame 310 includes a center portion, shown as main body 312, that defines a pair of laterally-extending apertures or passages, shown as pivot pin passages 314. The pivot pin passages 314 are aligned with one another along a common, laterally-extending axis. The pivot pin passages 314 receive a rod, pin, or axle, shown as pivot pin 316, that extends along a lateral axis. The pivot pin 316 is coupled to a frame member, shown as plate 318, that is laterally offset outward from the body 20. The plate 318 is positioned such that the track frame 310 extends directly between the plate 318 and the body 20. A pair of supports, shown as standoffs 320, extend laterally between the body 20 and the plate 318, fixedly coupling the plate 318 to the body 20. Accordingly, the track frame 310 is coupled to the body 20 through the pivot pin 316, the plate 318, and the standoffs 320. In some embodiments, the track frame 310 is rotatable about the pivot pin 316, such that the track frame 310 is pivotally coupled to the body 20.

Figure 12:
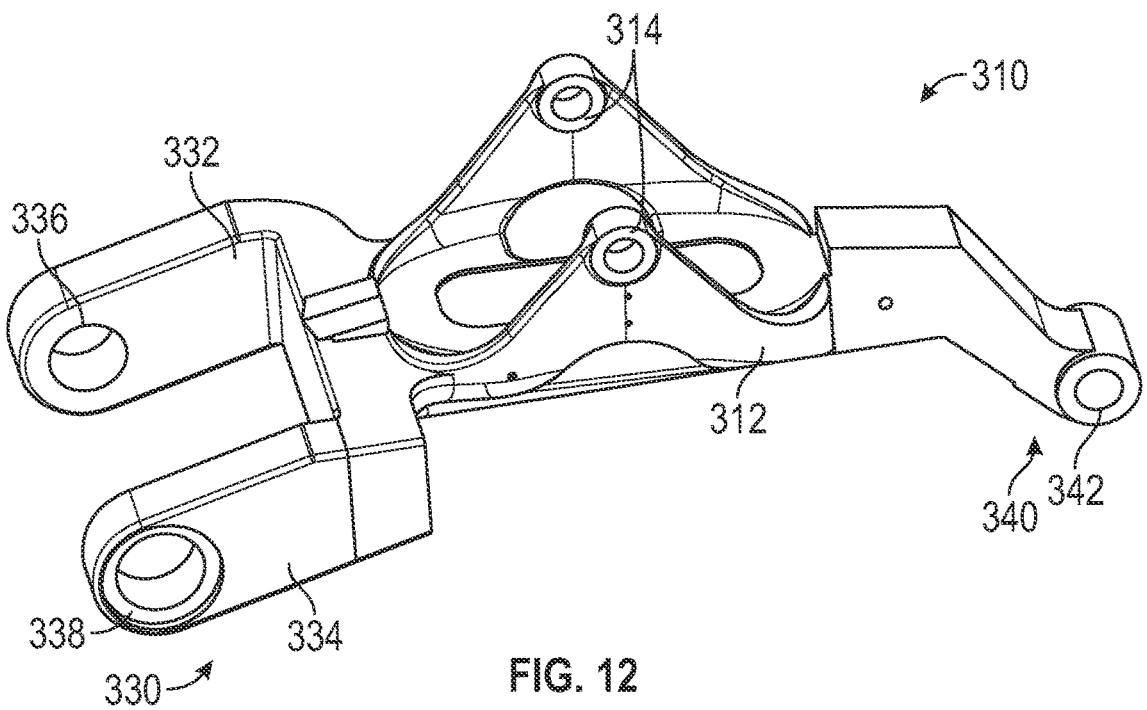
FIG. 12 is a perspective view of a track frame of the track assembly of FIG. 10, according to an exemplary embodiment.

Referring to FIGS. 10-12, the track frame 310 includes a first end portion or support portion, shown as fork 330, that is coupled to a first end of the main body 312. The fork 330 includes a first protrusion, plate, section, or fork arm, shown as fixed arm 332, and a second protrusion, plate, section, or fork arm, shown removable arm 334. The fixed arm 332 and the removable arm 334 each extend longitudinally away from the main body 312. In some embodiments, the fixed arm 332 is fixedly coupled to the main body 312 (e.g., welded to the main body 312, integrally formed as a single, continuous piece with the main body 312, etc.). In some embodiments, the removable arm 334 is removably coupled to the main body 312. By way of example, one or more fasteners may removably couple the removable arm 334 to the main body 312. The fixed arm 332 and the removable arm 334 are laterally offset from one another, defining a space that receives the drive module 350 (i.e., the fixed arm 332 and the removable arm 334 receive the drive module 350 therebetween). The fixed arm 332 defines a first aperture or passage, shown as splined passage 336, that extends laterally through the fixed arm 332. The removable arm 334 defines a second aperture or passage, shown as pin passage 338, that extends through the removable arm 334. In some embodiments, the splined passage 336 and the pin passage 338 are aligned with one another along a common lateral axis.

The track frame 310 further includes a second end portion or support portion, shown as idler support 340, that is coupled to a second end of the main body 312 opposite the fork 330. The idler support 340 extends longitudinally outward from the main body 312. The idler support 340 includes a coupler (e.g., a bearing, a pin, a boss, a protrusion, a passage, etc.), shown as bearing 342, that pivotally couples the front wheel 118 to the idler support 340. The bearing 342 may facilitate free rotation of the front wheel 118 relative to the track frame 310. In some embodiments, the center wheels 120 are pivotally coupled the track frame 310. The center wheels 120 may rotate freely relative to the track frame 310.

Referring to FIGS. 10-13, the drive module 350 includes a protrusion, pin, boss, or rod, shown as post 352. The post 352 is substantially circular. The post 352 is received within the splined passage 336 of the fixed arm 332 to couple the drive module 350 to the track frame 310. In the embodiment shown in FIG. 13, the post 352 has a circumferential outer surface, shown as splined surface 354, that defines a series of protrusions or splines. The inner surface of the splined passage 336 defines a corresponding series of protrusions or splines that engage the splines of the splined surface 354 to limit (e.g., prevent) rotation of the post 352 relative to the fixed arm 332. This splined engagement may transfer of torque from the track motor 130 to the track frame 310. In some embodiments, the track assembly 300 is assembled by inserting the post 352 of the drive module 350 into the splined passage 336 of the track frame 310. If the removable arm 334 were fixed to the main body 312 during this process, the removable arm 334 may interfere with insertion of the drive module 350. However, because the removable arm 334 is selectively removable from the main body 312, the drive module 350 can be inserted with the removable arm 334 removed, and the removable arm 334 can subsequently be reattached to the main body 312, thereby facilitating assembly.

Figure 13:
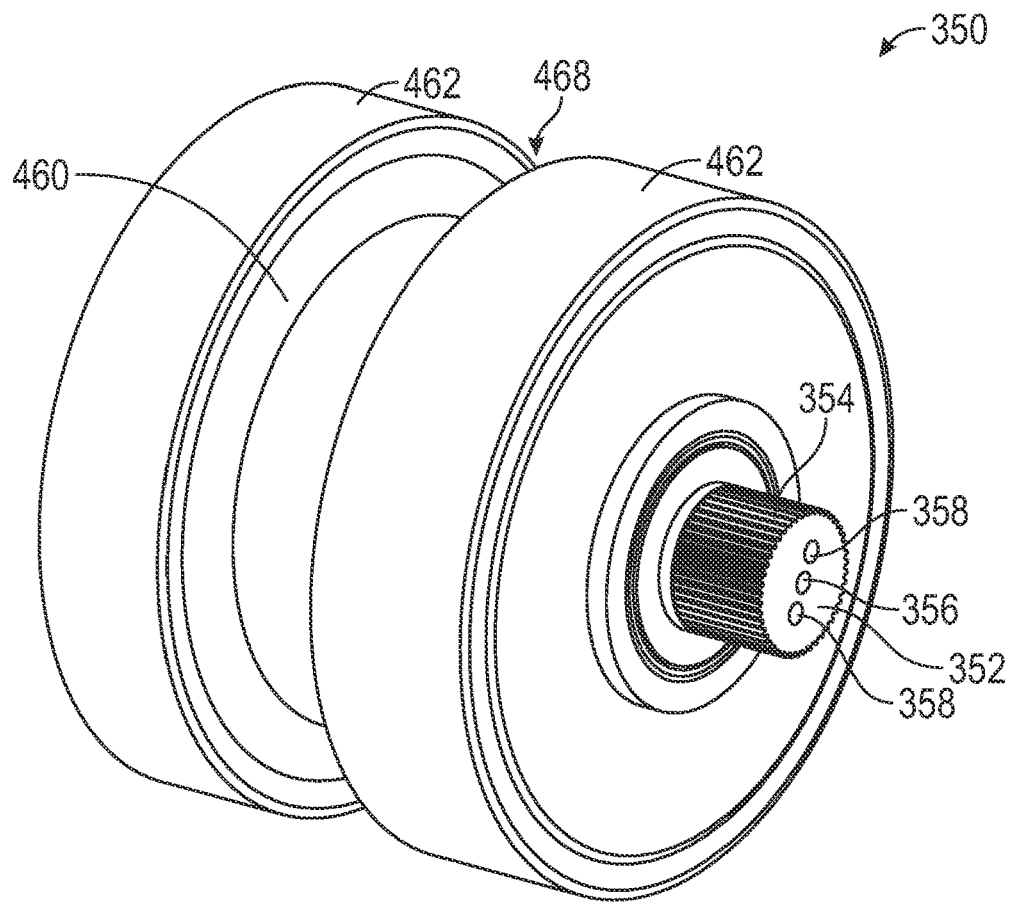
FIG. 13 is a perspective view of a drive module of the track assembly of FIG. 10, according to an exemplary embodiment.

Referring to FIG. 13, the post 352 defines a series of passages or apertures, shown as conductor passage 356 and coolant passages 358. The conductor passage 356 and the coolant passage 358 facilitate connection of the track motor 130 to the electrical system 160 and the coolant system 170, respectively. As shown, the post 352 defines one conductor passage 356 and two coolant passages 358. In other embodiments, the post 352 defines more or fewer conductor passages 356 and/or coolant passages 358 and/or the passages are otherwise positioned on the post 352.

Figure 14:
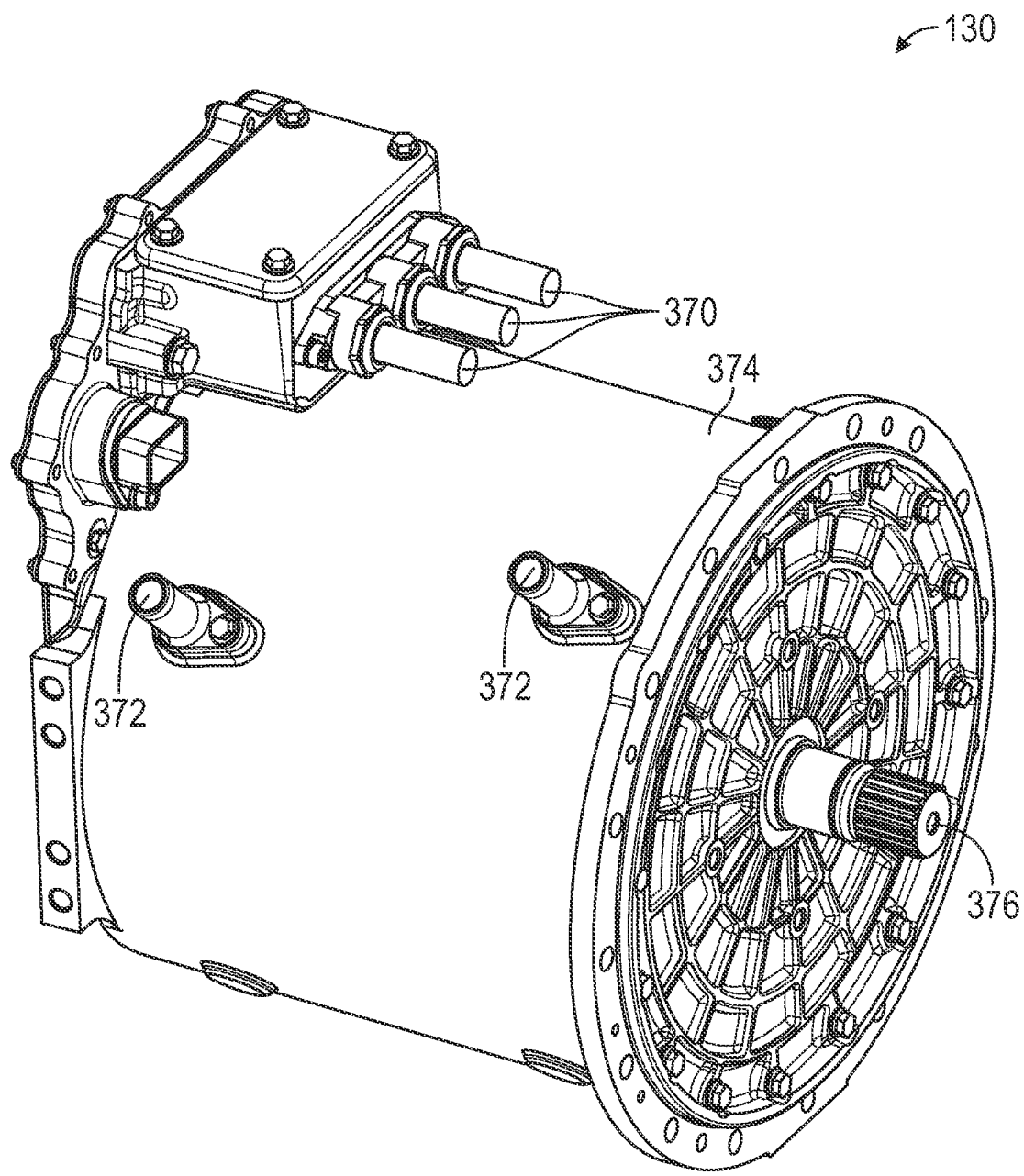
FIG. 14 is a perspective view of an electric motor of the drive module of FIG. 13, according to an exemplary embodiment.

Referring to FIGS. 13 and 14, the track motor 130 includes one or more conductors (e.g., connectors, wires, cables, an electrical connection, etc.), shown as wires 370, that pass through the conductor passage 356 and electrically couple to the electrical system 160. The wires 370 electrically couple the track motor 130 to the electrical system 160 to facilitate transfer of electrical energy to or from the track motor 130. The track motor 130 further includes a pair of apertures or passages (e.g., an inlet port and an outlet port), shown as coolant ports 372. The coolant ports 372 define an inlet and an outlet for introducing coolant to the track motor 130 and removing coolant from the track motor 130, respectively. The coolant ports 372 are fluidly coupled to the coolant passages 358, which are in turn fluidly coupled to the coolant system 170. Accordingly, the coolant passages 358 fluidly couple the coolant ports 372 of the track motor 130 to the coolant system 170. By way of example, the coolant may be in direct contact with the walls of coolant passages 358. By way of another example, the coolant may flow through a conduit (e.g., a hose or pipe, etc.) that extends through the coolant passages 358. As shown, the wires 370 and the coolant ports 372 are positioned along a circumferential side of the track motor 130. In other embodiments, the wires 370 and/or the coolant ports 372 are otherwise positioned on the track motor 130. By way of example, the wires 370 and the coolant ports 372 may be positioned along a back side of the track motor 130 to place the wires 370 and the coolant ports 372 in close proximity to the post 352.

Referring to FIG. 14, the track motor 130 includes a main portion or stationary portion, shown as motor body 374, and an output, shaft, or rotating portion, shown as motor shaft 376. When the track motor 130 is driven (e.g., by providing electrical energy through the wires 370), the motor shaft 376 rotates relative to the motor body 374. In some embodiments, the wires 370 and the coolant ports 372 are directly coupled to the motor body 374. In some embodiments, the motor body 374 is coupled to and contains a stator of the track motor 130. In some embodiments, the motor shaft 376 is coupled to a rotor of the track motor 130 and extends within the motor body 374. In one embodiment, the track motor 130 is a 750 volt motor capable of providing 125 kW of power.

Referring to FIG. 10, the track assembly 300 further includes a fastener, pin, or coupler, shown as pin 380. The pin 380 is positioned to couple the drive module 350 to the track frame 310. Specifically, the pin 380 extends through the pin passage 338 and engages the drive module 350 to couple the drive module 350 to the track frame 310. In some embodiments, the pin 380 is removably coupled to the removable arm 334 (e.g., using one or more fasteners). Removably coupling the pin 380 to the removable arm 334 may facilitate the addition of shims to account for manufacturing tolerances across the width of the drive module 350.

Figure 17:
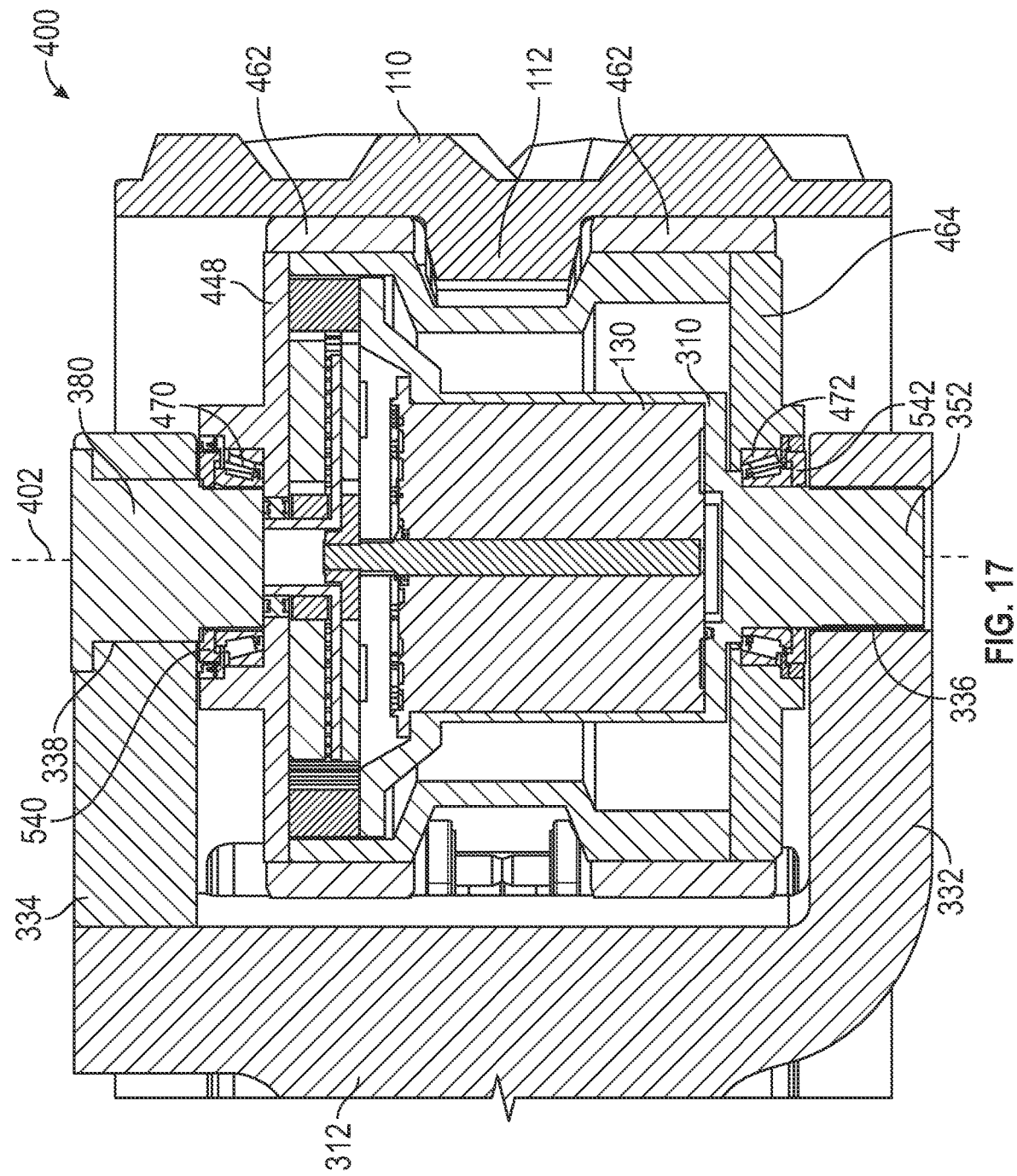

Referring to FIGS. 15-17, the track assembly 300 is shown including a drive module 400. The drive module 400 represents an exemplary embodiment of the drive module 350. During assembly of the track assembly 300, the removable arm 334 is removed from the main body 312 of the track frame 310. The post 352 is inserted into the splined passage 336, aligning the splines of the post 352 with the right spline passage 336. The removable arm 334 is coupled to the main body 312, containing the drive module 400 between the fixed arm 332 and the removable arm 334. The pin 380 is inserted into the pin passage 338 and the drive module 400, coupling the drive module 400 to the track frame 310.

In some embodiments, the track assembly 300 is provided as a retrofit kit to upgrade a tracked vehicle that does not include electric motors in its track assemblies. Advantageously, the drive module 350 may interact with (e.g., engage, drive) a track that is not specifically designed for use with the drive module 350. By way of example, the retrofit kit may include the drive module 350 and the track frame 310. In this example, the drive module 350 and the track frame 310 may replace the existing track frame and rear wheel of a track assembly without having to replace the track 110, the main drive wheel 114, the front wheel 118, and/or the center wheels 120, reducing costs. The existing front wheel 118 and center wheels 120 may simply be removed from the existing track frame and attached to the track frame 310. Alternatively, one or more of the track 110, the main drive wheel 114, the front wheel 118, or the center wheels 120 may be included as part of the retrofit kit.

Drive Module without Track Clutch

Referring to FIGS. 15-18, the track assembly 300 is shown including the drive module 400, according to an exemplary embodiment. The drive module 400 omits the track clutch 132. Accordingly, the track motor 130 may be rotationally engaged with the rear wheel 116 in all operational modes of the drive module 400. An axis (e.g., an axis of rotation, an axis of radial symmetry, etc.), shown as central axis 402, extends through the center of the drive module 400.

Figure 18:
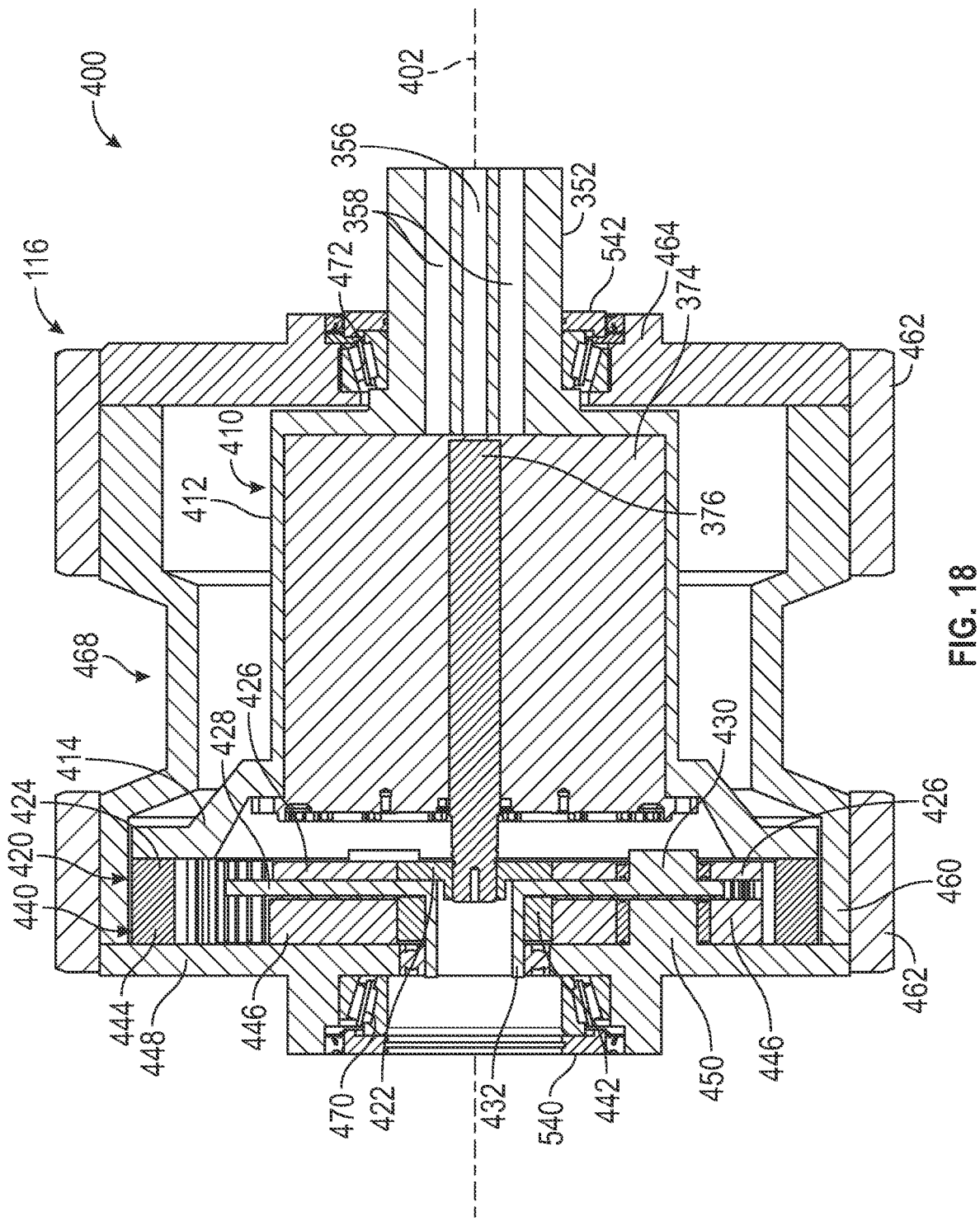
FIG. 18 is a front section view of the drive module of FIG. 15.

Referring to FIG. 18, the drive module 400 includes a housing, frame, or structural member, shown as motor support 410. The motor support 410 includes a first portion, receiver, cup, or housing, shown as motor housing 412; a second portion, radial protrusion, annular member, or mounting flange, shown as flange 414; and the post 352. The post 352 is fixedly coupled to a first end portion of the motor housing 412, and the flange 414 is fixedly coupled to a second end portion of the motor housing 412 opposite the post 352. In some embodiments, the motor housing 412, the flange 414, and the post 352 are integrally formed as a single, continuous piece of material. The motor housing 412 defines a volume that receives the motor body 374. The track motor 130 is positioned within the motor housing 412 such that the motor shaft 376 extends away from the post 352. The motor housing 412 is coupled (e.g., by one or more fasteners) to the motor body 374. The conductor passage 356 and the coolant passages 358 extend through the post 352 and the motor housing 412 to reach the track motor 130. In some embodiments, the flange 414 extends radially outward from the motor housing 412. In some embodiments, when the track motor 130 is coupled to the motor support 410, the post 352, the motor housing 412, the flange 414, the motor body 374, and the motor shaft 376 are all aligned along the central axis 402 of the drive module 400.

Figure 19:
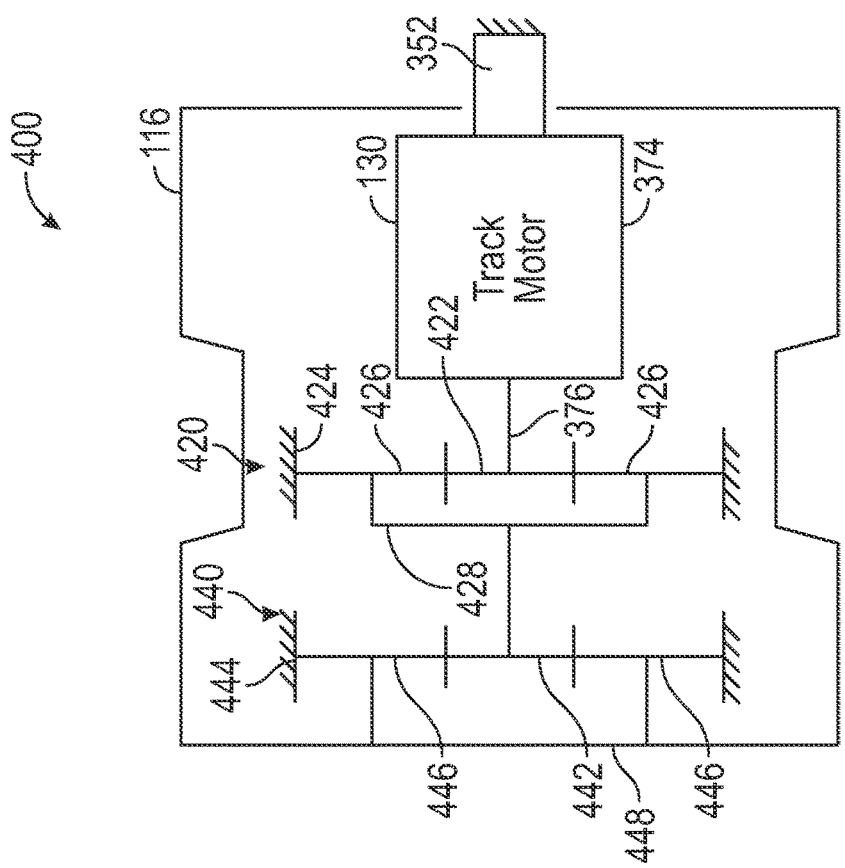
FIG. 19 is a schematic diagram of the drive module of FIG. 15.

Referring to FIGS. 18 and 19, the drive module 400 includes a pair of power transmissions, gearboxes, planetary devices, or gear sets, shown as planetary gear set 420 and planetary gear set 440. The planetary gear set 420 and the planetary gear set 440 couple the motor shaft 376 to the rear wheel 116, rotationally engaging the rear wheel 116 with the motor shaft 376. In some embodiments, the planetary gear set 420 and the planetary gear set 440 are configured (e.g., sized for a particular speed reduction, speed ratio, torque ratio, or gear ratio) to reduce an output speed and increase an output torque of the drive module 400 relative to an input speed and an input torque of the track motor 130. As shown in FIG. 18, the planetary gear set 420 and the planetary gear set 440 are centered about the central axis 402.

The planetary gear set 420 includes a sun gear 422, an annular gear or ring gear 424, a series of planetary gears or planet gears 426, and a carrier 428. The sun gear 422 is coupled (e.g., directly and fixedly coupled) to the motor shaft 376. The ring gear 424 is coupled (e.g., directly and fixedly coupled) to the flange 414. Accordingly, the ring gear 424 is coupled (e.g., indirectly and fixedly) to the motor body 374 and the track frame 310. The planet gears 426 extend between and engage the sun gear 422 and the ring gear 424, coupling the sun gear 422 to the ring gear 424. The carrier 428 is rotatably coupled to the planet gears 426, rotationally supporting the planet gears 426. Specifically, the carrier 428 includes protrusions or bosses, shown as pins 430, that are each received by one of the planet gears 426 (e.g., by a bearing or bushing of one of the planet gears 426) to rotatably couple the planet gears 426 to the carrier 428.

The planetary gear set 440 includes a sun gear 442, an annular gear or ring gear 444, a series of planetary gears or planet gears 446, and a carrier 448. The sun gear 442 is coupled (e.g., directly and fixedly coupled) to the carrier 428 of the planetary gear set 420. The ring gear 444 is coupled (e.g., directly and fixedly coupled) to the ring gear 424 of the planetary gear set 420. Accordingly, the ring gear 444 is coupled (e.g., indirectly and fixedly) to the motor body 374 and the track frame 310. The planet gears 446 extend between and engage the sun gear 442 and the ring gear 444, coupling the sun gear 442 to the ring gear 444. The carrier 448 is rotatably coupled to the planet gears 446, rotationally supporting the planet gears 446. Specifically, the carrier 448 includes protrusions or bosses, shown as pins 450, that are each received by one of the planet gears 446 (e.g., by a bearing or bushing of one of the planet gears 446) to rotatably couple the planet gears 446 to the carrier 448.

The carrier 448 is fixedly coupled to the rear wheel 116. As shown in FIG. 18, the rear wheel 116 includes a first portion or cylindrical body, shown as barrel 460; a pair of second portions, annular bodies, or tires, shown as treads 462; and a third portion or disc-shaped body, shown as plate 464. In some embodiments, the carrier 448, the barrel 460, the treads 462, the plate 464 are centered about the central axis 402 and rotate about the central axis 402. The carrier 448, the barrel 460, the treads 462, and the plate 464 are fixedly coupled to one another, forming the rear wheel 116. Accordingly, the rear wheel 116 rotates in unison with (with the same speed and direction as) the carrier 448. As shown, the carrier 448 is fixedly coupled to a first end of the barrel 460, and the plate 464 is fixedly coupled to a second end of the barrel 460 opposite the carrier 448.

The treads 462 surround the barrel 460 and the plate 464, defining an outer surface of the rear wheel 116 that engages an inner surface of the track 110 (e.g., as shown in FIG. 17). In some embodiments, the treads 462 have a relatively high coefficient of friction with the inner surface of the track 110, opposing (e.g., limiting, preventing) slip of the track 110 relative to the treads 462. By way of example, the treads 462 may include a material (e.g., rubber) that has a high coefficient of friction with the track 110, and/or the outer surface of the treads 462 may be treated (e.g., textured, coated, etc.) to increase the coefficient of friction with the track 110. The barrel 460 defines an annular recess, shown as lug groove 468, that extends around the circumference of the barrel 460. The treads 462 are offset from one another along the central axis 402, and the lug groove 468 is positioned between the treads 462 such that the lug groove 468 receives the lugs 112 of the track 110. In some embodiments, the barrel 460 includes a series of protrusions positioned within the lug groove 468 to engage the lugs 112 and transfer forces between the barrel 460 and the track 110.

Referring to FIGS. 17 and 18, the drive module 400 further includes a pair of rotating elements (e.g., bearings, bushings, etc.), shown as bearing 470 and bearing 472, that facilitate rotation of the rear wheel 116 relative to the track frame 310. The bearing 470 is coupled to the carrier 448 and aligned with the central axis 402. As shown in FIG. 17, the bearing 470 receives an end of the pin 380, pivotally coupling the carrier 448 to the removable arm 334 of the track frame 310. Accordingly, the pin 380 and the bearing 470 support a first end of the rear wheel 116 while facilitating free rotation of the rear wheel 116 relative to the track frame 310. The bearing 472 is coupled to the plate 464 and aligned with the central axis 402. The post 352 extends through the bearing 472, pivotally coupling the plate 464 to the fixed arm 332 of the track frame 310. Accordingly, the post 352 and the bearing 472 support a second end of the rear wheel 116 while facilitating free rotation of the rear wheel 116 relative to the track frame 310.

During operation, the drive module 400 may operate in a driving mode or a braking mode. By way of example, the drive module 400 may selectively switch between the driving mode and the braking mode (e.g., as controlled or directed by the controller 210). In the driving mode, the track motor 130 receives electrical energy (e.g., from the generator 162 and/or the energy storage 54) and provides mechanical energy (e.g., an output torque and rotation of the motor shaft 376). In the braking mode, the track motor 130 receives mechanical energy (e.g., an input torque and rotation of the motor shaft 376) and provides electrical energy (e.g., to the electrical system 160).

According to the exemplary embodiment of FIGS. 17-19, an energy flow path within the drive module 400 in the driving mode includes: the track motor 130 providing a rotational mechanical energy input to the sun gear 422; the sun gear 422 conveying the mechanical energy to the planet gears 426 while the ring gear 424 is fixed, causing the planet gears 426 to rotate about axes thereof as well as about the central axis 402; the carrier 428 transferring the mechanical energy from the planet gears 426 to the sun gear 442; the sun gear 442 conveying the mechanical energy to the planet gears 446 while the ring gear 444 is fixed, causing the planet gears 446 to rotate about axes thereof as well as about the central axis 402; the carrier 448 transferring the mechanical energy to the rear wheel 116; and the rear wheel 116 driving the track 110 to propel the vehicle 10. According to the exemplary embodiment of FIGS. 17-19, an energy flow path within the drive module 400 in the braking mode includes: the track 110 providing a mechanical energy input to the rear wheel 116; the carrier 448 transferring the mechanical energy from the rear wheel 116 to the planet gears 446, causing the planet gears 446 to rotate about axes thereof as well as about the central axis 402; the planet gears 446 transferring the mechanical energy to the sun gear 442 with the ring gear 444 fixed, causing the sun gear 442 to rotate about the central axis 402; the carrier 428 transferring the mechanical energy from the sun gear 442 to the planet gears 426, causing the planet gears 426 to rotate about axes thereof as well as about the central axis 402; the planet gears 426 transferring the mechanical energy to the sun gear 422 with the ring gear 424 fixed, causing the sun gear 422 and the motor shaft 376 to rotate about the central axis 402; and the track motor 130 receiving the mechanical energy and providing electrical energy.

In the embodiment shown in FIG. 18, the planetary gear set 420 and the planetary gear set 440 are configured (e.g., sized for a particular speed reduction, speed ratio, torque ratio, or gear ratio) to reduce an output speed and increase an output torque of the drive module 400 relative to an input speed and an input torque of the track motor 130. Specifically, the planetary gear set 420 and the planetary gear set 440 are arranged in series with one another, with the components of the planetary gear set 420 operating at greater speeds and lower forces than the components of the planetary gear sets 440. As shown, the thickness (i.e., measured parallel to the central axis 402) of the gears within the planetary gear set 440 is greater than the thickness of the gears within the planetary gear set 440. This may facilitate the components of the planetary gear set 440 withstanding greater internal forces than the planetary gear set 420 due to the gear reduction provided by each planetary gear set.

In the embodiment shown in FIG. 18, the planetary gear set 420 and the planetary gear set 440 are similarly sized, such that the planetary gear set 420 and the planetary gear set 440 have the same gear ratio. By way of example, the sun gear 422 and the sun gear 442 may have the same pitch diameter; the ring gear 424 and the ring gear 444 may have the same pitch diameter; and/or the planet gears 426 and the planet gears 446 may have the same pitch diameters. According to an exemplary embodiment, the planetary gear set 420 and the planetary gear set 440 each provide a 4.82:1 speed reduction, and the drive module 400 provides an overall 23.23:1 speed reduction. As shown in FIG. 18, the ring gear 424 and the ring gear 444 are integrally formed as a single, continuous piece with a single, continuous tooth pattern throughout.

In other embodiments, the drive module 400 provides a different speed ratio. By way of example, the drive module 400 may include more or fewer planetary gear sets (e.g., one planetary gear set, three planetary gear sets, etc.). By way of another example, the drive module 400 may include planetary gear sets of different ratios (e.g., a 5:1 speed reduction and a 3:1 speed reduction, a 10:1 speed reduction and an 8:1 speed reduction, etc.). By way of another example, the planetary gear set 420 and the planetary gear set 440 may be omitted, and the rear wheel 116 may be directly coupled to the motor shaft 376. By way of another example, the drive module 400 may utilize a different type of gearbox or transmission (e.g., a gearbox with helical or spur gears, a continuously variable transmission, etc.). In such an example, the track motor 130 may be moved outside of the rear wheel 116 and/or out of alignment with the rear wheel 116.

Referring to FIGS. 17 and 18, the drive module 400 advantageously provides a self-contained electric drive arrangement for the track assembly 300. The drive module 400 may be assembled separately from the vehicle 10 In some embodiments, the track motor 130 (e.g., the motor body 374 and/or the motor shaft 376 thereof), the motor support 410 (e.g., the post 352, the motor housing 412, and/or the flange 414 thereof), the planetary gear set 420 (e.g., the sun gear 422, the ring gear 424, and/or the carrier 428 thereof), the planetary gear set 440 (e.g., the sun gear 442, the ring gear 444, and/or the carrier 448 thereof), the rear wheel 116 (e.g., the barrel 460, the treads 462, and/or the plate 464 thereof), the bearing 470, the bearing 474, and/or the pin 480 are all aligned with the central axis 402. In some embodiments, the track motor 130, the planetary gear set 420, and/or the planetary gear set 440 are at least partially surrounded by (e.g., contained within) the rear wheel 116. In the embodiment of FIG. 17, the rear wheel 116 defines a volume therein that contains the track motor 130, the planetary gear set 420, and the planetary gear set 440. This arrangement reduces the overall volume of the drive module 400 relative to an alternative drive arrangement where a track motor and/or one or more gear sets are positioned outside of a wheel. Additionally, the track motor 130, the planetary gear set 420, and the planetary gear set 440 are protected from contact with debris (e.g., soil, rocks, etc.), improving the durability of the track assembly 300.

Drive Module with Track Clutch

Referring to FIGS. 20-22, a drive module 500 is shown according to an exemplary embodiment. The drive module 500 represents an exemplary embodiment of the drive module 350. Certain features of the drive module 500 are substantially similar to those of the drive module 400. Accordingly, any description of the drive module 400 may apply to the drive module 500, unless specified otherwise.

Referring to FIG. 20, the drive module 500 includes the track clutch 132 that selectively couples the track motor 130 to the rear wheel 116. Specifically, the track clutch 132 is positioned to selectively couple the carrier 428 of the planetary gear set 420 to the sun gear 442 of the planetary gear set 440. When the track clutch 132 is engaged, the track clutch 132 couples (e.g., fixedly couples) the carrier 428 to the sun gear 442, thereby coupling the motor shaft 376 of the track motor 130 to the rear wheel 116 through the planetary gear set 420, track clutch 132, and the planetary gear set 440. When the track clutch 132 is disengaged, the track clutch 132 decouples the carrier 428 from the sun gear 442, thereby decoupling the track motor 130 from the rear wheel 116. With the track clutch 132 disengaged, the track motor 130 may drive the sun gear 422, the planet gears 426, and the carrier 428 to rotate independent of the planetary gear set 440 and the rear wheel 116. Similarly, with the track clutch 132 disengaged, the rear wheel 116 may drive the sun gear 442, the planet gears 446, and the carrier 448 to rotate independent of the planetary gear set 420 and the track motor 130. Accordingly, the track clutch 132 facilitates movement of the track 110 (e.g., caused by the prime mover 52, when the vehicle 10 is in a neutral configuration, etc.) without causing a corresponding movement of the track motor 130.

Referring to FIGS. 21 and 22, the arrangement of the track clutch 132 is shown according to an exemplary embodiment. The carrier 428 includes a protrusion, shown as post 510, that extends along the central axis 402 and is received by the sun gear 442. The post 510 may have a cylindrical shape such that the post 510 is rotatable relative to the sun gear 442 when the post 510 is received by the sun gear 442. A series of frictional elements or clutch elements, shown as clutch plates 512 and clutch plates 514, extend between the post 510 and the sun gear 442. The clutch plates 512 and the clutch plates 514 are annular and surround the post 510. The clutch plates 512 are coupled to the sun gear 442 and extend radially inward toward the post 510. The clutch plates 512 engage the sun gear 442 such that rotation of the clutch plates 512 relative to the sun gear 442 is limited (e.g., prevented). The clutch plates 514 are coupled to the post 510 and extend radially outward toward the sun gear 442. The clutch plates 514 engage the post 510 such that rotation of the clutch plates 514 relative to the post 510 is limited (e.g., prevented). As shown, the clutch plates 512 and the clutch plates 514 are arranged along the central axis 402 in an alternating pattern (e.g., a clutch plate 512, then a clutch plate 514, then a clutch plate 512, then a clutch plate 515, etc.), forming a stack. Accordingly, each clutch plate 512 is directly adjacent to (e.g., engages) at least one clutch plate 514, and each clutch plate 514 is directly adjacent to at least one clutch plate 512.

An annular element or pressing element, shown as piston 516 is positioned at an end of the stack, such that the clutch plates 512 and the clutch plates 514 extend directly between the piston 516 and the carrier 428. When the piston 516 is forced along the central axis 402 towards the carrier 428, the stack of the clutch plates 512 and the clutch plates 514 is compressed between the piston 516 and the carrier 428. This forces the clutch plates 512 to engage the adjacent clutch plates 514, increasing the frictional forces between the clutch plates 512 and the clutch plates 514 and opposing (e.g., preventing) relative movement between the sun gear 442 and the carrier 428.

In some embodiments, the track clutch 132 is hydraulically activated to couple the sun gear 442 to the carrier 428. As shown, in embodiments of the track assembly 300 that utilize the drive module 500, the pin 380 defines a cavity or volume, shown as sun gear chamber 520, that receives an end portion of the sun gear 442. The pin 380 further defines an activation fluid passage or conduit, shown as fluid passage 522. The fluid passage 522 extends from (a) an inlet that is positioned on an outer surface of the pin 380 that is accessible when the pin 380 is assembled with the track frame 310 to (b) the sun gear chamber 520. In the embodiment shown in FIG. 22, the fluid passage 522 includes both (a) a first, longitudinal portion that extends inward from the inlet, parallel to the central axis 402 and (b) a second, radial portion that extends from the first portion of the fluid passage 522 to the sun gear chamber 520.

The sun gear 442 defines an activation fluid passage or conduit, shown as fluid passage 524, that fluidly couples the fluid passage 522 to the piston 516. During operation of the drive module 500, the sun gear 442 may rotate relative to the pin 380. To facilitate operation of the track clutch 132 when this occurs, the sun gear 442 further defines an annular groove or recess, shown as fluid groove 526, that extends along a circumference of the sun gear 442. The fluid groove 526 is fluidly coupled to the fluid passage 524 and positioned in directly fluid communication with the fluid passage 522. Because the fluid groove 526 extends along the entire circumference of the sun gear 442, the fluid groove 526 fluidly couples the fluid passage 522 to the fluid passage 524, regardless of the rotational position of the sun gear 442. A pair of seals (e.g., o-ring seals, etc.), shown as seals 528, are positioned on opposite sides of the fluid groove 526. The seals 528 each engage both the pin 380 the sun gear 442, preventing fluid from the fluid groove 526 from leaking out between the pin 380 and the sun gear 442.

In some embodiments, the inlet of the fluid passage 522 is fluidly coupled to a source of pressurized fluid that is controlled by the controller 210. By way of example, the controller 210 may activate a valve (e.g., a solenoid valve, etc.) that selectively directs pressurized fluid (e.g., hydraulic oil, air, etc.) to the inlet of the fluid passage 522. By way of another example, the controller 210 may activate a pump or compressor that selectively provides pressurized fluid to the fluid passage 522. When pressurized fluid is provided to the fluid passage 522, the fluid passes through the fluid passage 522, the fluid groove 526, and the fluid passage 524 and engages a surface of the piston 516 opposite the clutch plates 512 and the clutch plates 514. The pressurized fluid presses against the surface of the piston 516, forcing the clutch plates 512 and the clutch plates 514 against one another and engaging the track clutch 132. In some embodiments, the track clutch 132 defaults to a disengaged configuration when no pressurized fluid is supplied to the fluid passage 522.

Referring to FIG. 22, the track clutch 132 further includes a fastener assembly or retainer assembly, shown as clutch fastener assembly 530, that is configured to couple the sun gear 442 to the post 510. The clutch fastener assembly 530 includes a shaft (e.g., a shoulder bolt), shown as fastener shaft 532, that is coupled (e.g., fixedly) to the sun gear 442. In some embodiments, the fastener shaft 532 is in threaded engagement with the sun gear 442. The fastener shaft 532 extends through an aperture or passage, shown as shaft passage 534, that extends through the carrier 428. The shaft passage 534 may be oversized relative to the fastener shaft 532 such that the fastener shaft 532 can rotate freely relative to the carrier 428. A flange 536 and a bushing or bearing, shown as thrust bearing 538, are positioned on a side of the carrier 428 opposite the sun gear 442. The flange 536 is coupled to an end of the fastener shaft 532 (e.g., fixedly coupled, by a snap ring or other fastener that engages the fastener shaft 532, welded, etc.) opposite the sun gear 442. The thrust bearing 538 is positioned between and engages the flange 536 and the carrier 428. As shown in FIG. 22, the fastener shaft 532, the shaft passage 534, the flange 536, and the thrust bearing 538 are all aligned with the central axis 402. When fluid pressure is supplied to the fluid passage 522, the fluid pressure introduces a force onto the sun gear 442 that attempts to move the sun gear 442 away from the carrier 428. Responsive to this force, the fastener shaft 532 and the flange 536 press the thrust bearing 538 against the carrier 428, limiting movement of the sun gear 442 away from the carrier 428. The thrust bearing 538 may reduce frictional forces within the clutch fastener assembly 530, thereby facilitating free rotation of the sun gear 442 relative to the carrier 428.

In other embodiments, the track clutch 132 is otherwise configured or controlled. By way of example, the track clutch 132 may utilize a dog clutch instead of the clutch plates 512 and the clutch plates 514. By way of example, the fluid passage 524 may be repositioned to direct fluid toward a surface of the piston 516 that is on the same side as the clutch plates 512 and the clutch plates 514, such that the track clutch 132 is disengaged when pressurized fluid is supplied to the fluid passage 522. By way of another example, the track clutch 132 may include a spring that biases the piston 516 toward a disengaged position (e.g., in which the track clutch 132 is disengaged) or an engaged position (e.g., in which the track clutch 132 is engaged). By way of another example, the track clutch 132 may include an electric actuator (e.g., a solenoid) controlled by the controller 210 that applies a force to the piston 516 to engage or disengage the track clutch 132.

In some embodiments, the pin 380 is configured to provide an adjustable preload force on the bearing 470 and the bearing 472. Referring to FIGS. 17, 21, and 22, the drive module 500 includes a pair of exterior seal assemblies, shown as seal assembly 540 and seal assembly 542, that seal the drive module 500 (e.g., including the bearing 470, the bearing 472, the track motor 130, the planetary gear set 420, and the planetary gear set 550, etc.). The drive module 400 may include a similar seal arrangement. The seal assembly 540 is annular and surrounds the pin 380. The seal assembly 540 is positioned directly between the bearing 470 and the pin 380. Specifically, the seal assembly 540 engages a step or shoulder, shown as shoulder 550, of the pin 380. The seal assembly 542 is annular and surrounds the post 352. The seal assembly 542 is positioned directly between the bearing 472 and the fixed arm 332 of the track frame 310.

The seal assembly 540 and the seal assembly 542 each include a center portion, support portion, or annular support (e.g., a bushing, a spacer, etc.), shown as seal bushing 544; an interior seal portion, shown as inner seal 546; and an exterior seal portion, shown as outer seal 548. The seal bushing 544 is structured to transfer axial loads therethrough (e.g., may be made of a metal, such as steel). The inner seal 546 is positioned on an interior surface of the seal bushing 544. The inner seal 546 extends radially inward from the seal bushing 544 to form a seal with a component positioned radially inward of the seal bushing 544. Specifically, the inner seal 546 of the seal assembly 540 engages and seals against the pin 380, and the inner seal 546 of the seal assembly 542 engages and seals against the post 352. The outer seal 548 extends radially outward from the seal bushing 544 to form a seal with a component positioned radially outward of the seal bushing 544. Specifically, the outer seal 548 of the seal assembly 540 engages and seals against the carrier 448, and the outer seal 548 of the seal assembly 542 engages and seals against the plate 464.

When the track assembly 300 is fully assembled, the pin 380 is forced toward the fixed arm 332 of the track frame 310. The shoulder 544 of the pin 380 presses the seal bushing 544 of the seal assembly 540 against the bearing 470, providing a preload force to seat the bearing 470 against the carrier 448. The normal force of the fixed arm 332 presses the seal bushing 544 of the seal assembly 542 against the bearing 472, seating the bearing 472 against the plate 464. Accordingly, the seating forces on the bearing 470 and the bearing 472 vary based on the insertion distance of the pin 380. In some embodiments, the track assembly 300 includes one or more spacers, shims, or washers, shown as pin spacers 552, that extend between the pin 380 and the removable arm 334 of the track frame 310. By adding more pin spacers 552 and/or increasing the thickness of the pin spacers 552, the distance between the pin 380 and the removable arm 334 may be increased, thereby decreasing the insertion distance of the pin 380 and the preload forces on the bearing 470 and the bearing 472. Accordingly, a user may adjust these preload forces by varying the number of pin spacers 552 and/or by providing pin spacers 552 of different thicknesses.

Alternative Vehicle Implementations

Figure 23:
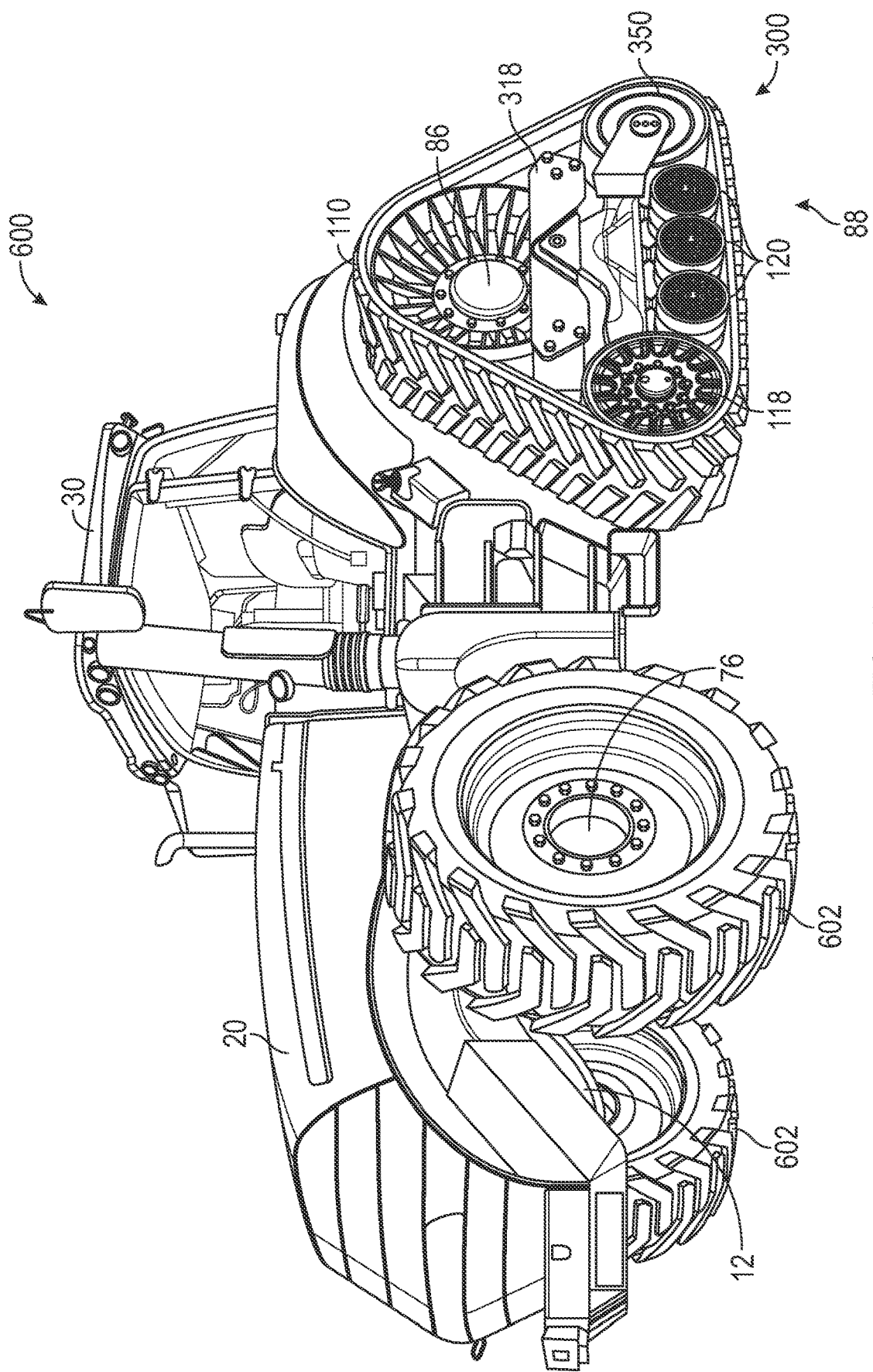
FIG. 23 is a front left perspective view of a vehicle, according to another exemplary embodiment.

Referring to FIG. 23, an off-road vehicle is shown as vehicle 600 according to an exemplary embodiment. Certain features of the vehicle 600 are substantially similar to the vehicle 10. Accordingly, any description of the vehicle 10 may apply to the vehicle 600 unless specified otherwise. The vehicle 600 illustrates a vehicle including steerable tractive elements. In the vehicle 600, the front tractive elements 78 are omitted and replaced with a pair of tractive elements, shown as wheels 602. The wheels 602 are steerable relative to the body 20. Accordingly, the turning actuators 26 are omitted from the vehicle 600, and the body 20 is made from a single piece, as opposed to the pivotable first portion 22 and second portion 24 of the vehicle 10.

Figure 24:
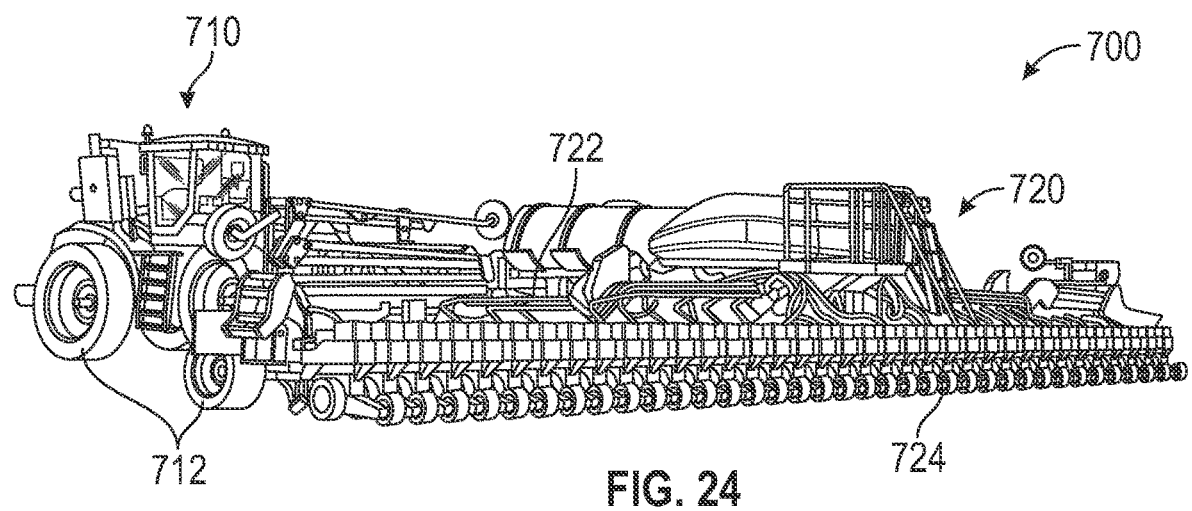
FIG. 24 is a front right perspective view of an implement driven by a vehicle, according to an exemplary embodiment.
Figure 25:
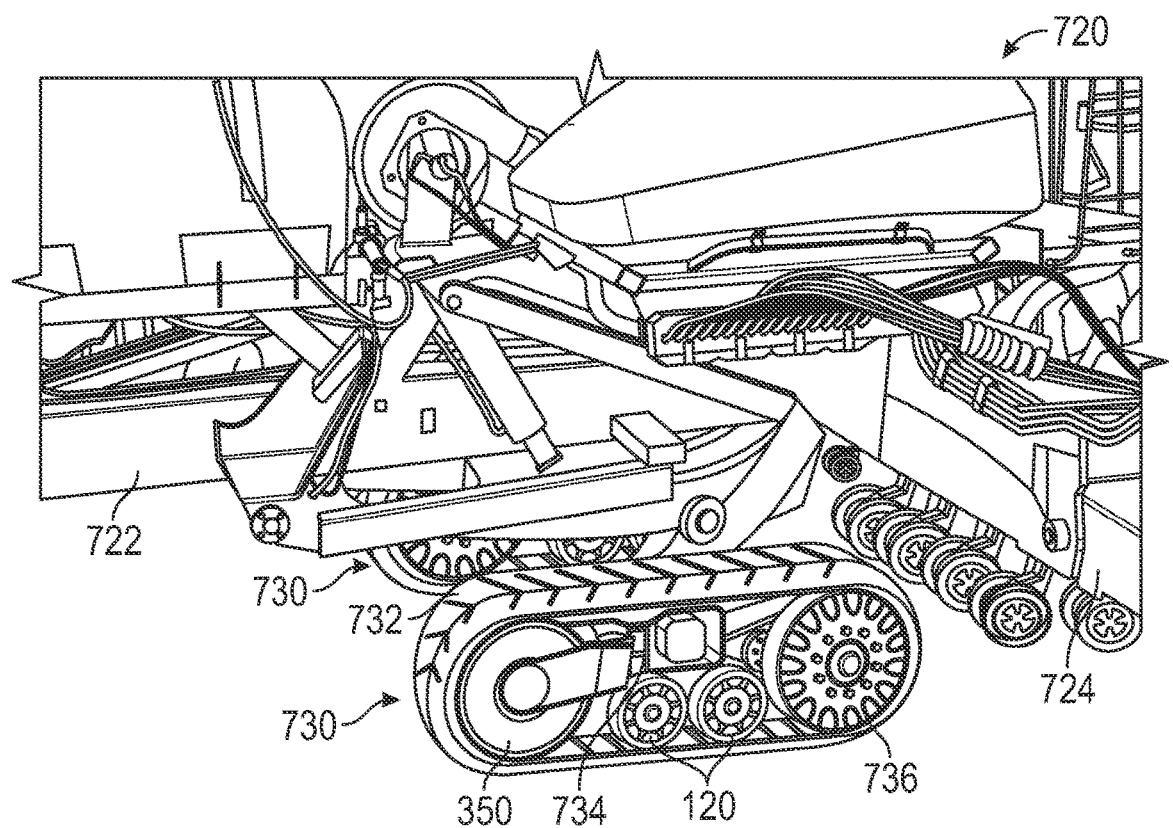
FIG. 25 is a right perspective view of the implement of FIG. 24.

Referring to FIGS. 24 and 25, an off-road vehicle assembly 700 is shown according to an exemplary embodiment. The off-road vehicle assembly 700 includes a first vehicle, shown as tractor 710, and a second vehicle (e.g., a self-propelled implement), shown as implement 720. Certain features of the tractor 710 and the implement 720 are substantially similar to the vehicle 10. Accordingly, any description of the vehicle 10 may apply to the tractor 710 and the implement 720 unless specified otherwise. The tractor 710 includes tractive elements, shown as wheels 712. The tractor 710 may steer and/or propel (e.g., tow, push, etc.) the implement 720 in certain modes of operation of the off-road vehicle assembly 700.

The implement 720 includes a chassis, shown as frame 722. Coupled to the frame 722 is a tool, shown as sprayer 724, that facilitates operation of the implement 720. In other embodiments, the implement 720 includes a different type of tool (e.g., a mower deck, a plough, a baler mechanism, a tiller, etc.). Coupled to the frame 722 is a pair of track assemblies 730. Certain features of the track assembly 730 are substantially similar to the track assembly 300. Accordingly, any description of the track assembly 300 may apply to the track assembly 730 unless specified otherwise.

Each track assembly 730 includes a track 732, a track frame 734, a front wheel 736, a pair of the central wheels 120, and the drive module 350. The track frame 734 is rotatably coupled to the front wheel 736 and the central wheels 120. The drive module 350 is coupled to the track frame 734 in a similar manner to the connection to the track frame 310. The track 732 surrounds and engages the front wheel 736, the central wheels 120, and the drive module 350. The track motors 130 of the drive module 350 may drive the track 732 to propel the implement 720. Accordingly, the track assembly 730 provides for self-propelled operation of the implement 720. In some embodiments, the propulsion forces applied by the track assemblies 730 supplement the forces applied by the tractor 710 (e.g., to facilitate steering of the implement 720, to reduce the possibility of the implement 720 getting stuck in muddy conditions, etc.). In such embodiments, the track assemblies 730 may be controlled by a controller of the tractor 710. In other embodiments, the implement 720 may operate independent of the tractor 710 (e.g., to move the implement 720 out of a storage area). In such embodiments, the implement 720 may include energy storage (e.g., the energy storage 54) and/or a controller (e.g., the controller 210).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

The invention claimed is:
1. A track assembly, comprising:
a frame configured to be coupled to a chassis of a vehicle;
a drive wheel engaging a track;

a motor including a motor shaft and a motor body, the motor shaft being positioned to drive the drive wheel to propel the track;
a first pin coupling the motor body to the frame; and
a second pin pivotally coupling the drive wheel to the frame,
wherein the first pin, the second pin, the motor shaft, and the drive wheel are aligned.

2. The track assembly of claim 1, wherein the frame defines an aperture that receives the first pin, and wherein the first pin limits rotation of the motor body relative to the frame.

3. The track assembly of claim 2, wherein the motor is an electric motor, and wherein the first pin defines at least one of:
a coolant passage fluidly coupled to the electric motor; or
a conductor passage that receives a conductor electrically coupled to the electric motor.

4. The track assembly of claim 3, wherein the first pin defines both:
the coolant passage fluidly coupled to the electric motor; and
the conductor passage that receives the conductor electrically coupled to the electric motor.

5. The track assembly of claim 3, wherein the frame includes a first portion that defines the aperture and a second portion coupled to the second pin, wherein the second portion is removably coupled to the first portion.

6. The track assembly of claim 2, further comprising a clutch selectively coupling the motor to the drive wheel, wherein the clutch is positioned between the motor and the second pin.

7. The track assembly of claim 6, wherein the second pin defines a fluid passage that extends through the second pin, and wherein the fluid passage is fluidly coupled to the clutch.

8. The track assembly of claim 7, wherein the clutch includes a piston and a plurality of clutch plates, and wherein the fluid passage is fluidly coupled to the piston.

9. The track assembly of claim 8, wherein the piston is positioned to compress the clutch plates and engage the clutch in response to a pressurized fluid being supplied to the fluid passage.

10. The track assembly of claim 9, wherein the clutch further includes a first portion coupled to the motor shaft and a second portion coupled to the drive wheel, wherein the first portion is rotatable relative to the second portion when the clutch is disengaged, wherein the first portion is fixed relative to the second portion when the clutch is engaged, and wherein the second portion is configured to rotate relative to the pin when the drive wheel rotates.

11. A vehicle, comprising:
a chassis;
a track frame coupled to the chassis;
a drive wheel engaging a track;
a motor including a motor shaft and a motor body, the motor shaft being positioned to drive the drive wheel to propel the track;
a pin coupling the motor to the track frame; and
a clutch selectively coupling the motor shaft to the drive wheel,
wherein the clutch is positioned between the motor body and the pin, and wherein the pin and the motor shaft are aligned.

12. The vehicle of claim 11, wherein the clutch includes a piston and a plurality of clutch plates, wherein the pin defines a fluid passage that extends through the pin, wherein the fluid passage is fluidly coupled to the piston, and wherein the piston is positioned to compress the clutch plates and engage the clutch in response to a pressurized fluid being supplied to the fluid passage.

13. The vehicle of claim 12, wherein the clutch further includes a first portion coupled to the motor shaft and a second portion coupled to the drive wheel, wherein the first portion is rotatable relative to the second portion when the clutch is disengaged, wherein the first portion is fixed relative to the second portion when the clutch is engaged, and wherein the second portion is configured to rotate relative to the pin when the drive wheel rotates.

14. The vehicle of claim 13, wherein the fluid passage is a first fluid passage, wherein the second portion of the clutch defines a second fluid passage that fluidly couples the first fluid passage to the piston.

15. The vehicle of claim 14, wherein the second portion of the clutch defines an annular fluid groove positioned to fluidly couple the first fluid passage to the second fluid passage throughout an entire rotation of the second portion of the clutch relative to the pin.

16. The vehicle of claim 11, further comprising a second pin, wherein the track frame defines an aperture that receives the second pin.

17. The vehicle of claim 16, wherein the second pin limits rotation of the motor body relative to the track frame.

18. The vehicle of claim 17, wherein the motor is an electric motor, and wherein the second pin defines at least one of:
a coolant passage fluidly coupled to the electric motor; or
a conductor passage that receives a conductor electrically coupled to the electric motor.

19. The vehicle of claim 17, wherein the second pin defines both:
the coolant passage fluidly coupled to the electric motor; and
the conductor passage that receives the conductor electrically coupled to the electric motor.

20. The vehicle of claim 17, wherein the frame includes a first portion that defines the aperture and a second portion coupled to the second pin, wherein the second portion is removably coupled to the first portion.

* * * * *